(12) United States Patent
Park et al.

(10) Patent No.: US 10,454,853 B2
(45) Date of Patent: Oct. 22, 2019

(54) ELECTRONIC DEVICE AND METHOD FOR SENDING RESPONSE MESSAGE ACCORDING TO CURRENT STATUS

(71) Applicant: Samsung Electronics Co. Ltd., Suwon-si, Gyeonggi-do (KR)

(72) Inventors: Young-Soo Park, Suwon-si (KR); Hong-Seok Yang, Suwon-si (KR); Yang-Wook Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 150 days.

(21) Appl. No.: 14/035,059

(22) Filed: Sep. 24, 2013

(65) Prior Publication Data

US 2014/0143356 A1 May 22, 2014

(30) Foreign Application Priority Data

Nov. 16, 2012 (KR) .......................... 10-2012-0130234

(51) Int. Cl.
*H04L 12/58* (2006.01)
(52) U.S. Cl.
CPC ............ *H04L 51/02* (2013.01); *H04L 51/043* (2013.01); *H04L 51/38* (2013.01)
(58) Field of Classification Search
CPC ... H04L 12/403; H04L 12/2803; H04L 12/58; H04L 51/02; H04L 51/403; H04L 51/38
USPC ........................................................ 709/206
See application file for complete search history.

(56) References Cited

U.S. PATENT DOCUMENTS

| | | | | |
|---|---|---|---|---|
| 6,327,046 B1 * | 12/2001 | Miyamoto | ............. | G06Q 10/10 358/1.15 |
| 6,496,853 B1 * | 12/2002 | Klein | .................. | G06Q 10/107 709/206 |
| 6,760,753 B1 * | 7/2004 | Ohgushi | ............. | G06Q 10/107 709/206 |
| 7,552,177 B2 * | 6/2009 | Kessen | .................. | H04L 51/04 709/204 |

(Continued)

FOREIGN PATENT DOCUMENTS

| | | |
|---|---|---|
| CN | 1522088 A | 8/2004 |
| CN | 101568083 A | 10/2009 |

(Continued)

OTHER PUBLICATIONS

Japanese Notice of Patent Grant dated Jul. 31, 2018, issued in Japanese Patent Application No. 2013-165297.
(Continued)

*Primary Examiner* — Vivek Srivastava
*Assistant Examiner* — Binod J Kunwar
(74) *Attorney, Agent, or Firm* — Jefferson IP Law, LLP

(57) ABSTRACT

An electronic device and a method for sending a response message according to a current status are provided. An operating method of the electronic device includes determining whether a received message is confirmed within a preset time, when the received message is not confirmed within the preset time, determining whether a contact number of a sender electronic device is a preset contact number, and when the contact number of the sender electronic device is the preset contact number, sending an automatic response message to the sender electronic device corresponding to a preset automatic response message status.

12 Claims, 12 Drawing Sheets

(56) References Cited

U.S. PATENT DOCUMENTS

| | | | | |
|---|---|---|---|---|
| 7,725,549 | B2* | 5/2010 | Bauchot | G06Q 10/107 709/203 |
| 7,778,858 | B1* | 8/2010 | Daily | G06Q 10/06311 705/7.15 |
| 7,809,794 | B2* | 10/2010 | Fellenstein | H04L 12/587 709/205 |
| 7,844,037 | B2* | 11/2010 | Champlin | H04L 51/066 379/88.17 |
| 8,050,690 | B2* | 11/2011 | Neeraj | G06Q 10/10 455/456.1 |
| 8,090,387 | B1* | 1/2012 | Batson, Jr. | H04W 4/02 455/414.2 |
| 8,230,034 | B2* | 7/2012 | Atkins | G06Q 10/107 709/206 |
| 8,296,376 | B2* | 10/2012 | Goldberg | G06Q 10/107 709/206 |
| 8,307,029 | B2* | 11/2012 | Davis | G06Q 10/107 709/203 |
| 8,315,597 | B2* | 11/2012 | Olincy | H04M 3/42348 455/410 |
| 8,352,560 | B2* | 1/2013 | O'Sullivan | G06Q 10/107 709/206 |
| 8,495,501 | B2* | 7/2013 | Kadashevich | G06Q 10/1093 705/7.15 |
| 8,548,509 | B2* | 10/2013 | Goyal | H04M 3/42382 455/412.1 |
| 9,002,949 | B2* | 4/2015 | Appleman | H04L 12/581 709/206 |
| 9,094,363 | B1* | 7/2015 | Lin | H04L 51/36 |
| 2001/0007993 | A1* | 7/2001 | Wu | G06Q 10/107 709/207 |
| 2005/0188041 | A1* | 8/2005 | Kuriki | G06Q 10/107 709/206 |
| 2006/0026254 | A1* | 2/2006 | Kessen | H04L 51/04 709/207 |
| 2006/0116139 | A1* | 6/2006 | Appelman | H04L 12/581 455/466 |
| 2006/0168028 | A1* | 7/2006 | Duxbury | H04L 12/585 709/206 |
| 2007/0011367 | A1* | 1/2007 | Scott | G06Q 10/10 710/48 |
| 2007/0101284 | A1* | 5/2007 | Shaw | G06Q 10/107 715/772 |
| 2007/0124396 | A1* | 5/2007 | Febonio | G06Q 10/107 709/206 |
| 2007/0161382 | A1* | 7/2007 | Melinger | H04L 67/18 455/456.1 |
| 2007/0245245 | A1* | 10/2007 | Blue | G06F 17/30864 715/739 |
| 2008/0108334 | A1 | 5/2008 | Wang et al. | |
| 2008/0171559 | A1* | 7/2008 | Frank et al. | 455/456.5 |
| 2009/0016170 | A1 | 1/2009 | Tanaka | |
| 2009/0037541 | A1 | 2/2009 | Wilson | |
| 2011/0066690 | A1* | 3/2011 | Ellanti | G06Q 10/107 709/206 |
| 2011/0077033 | A1* | 3/2011 | Shuai | H04W 4/16 455/466 |
| 2011/0251898 | A1* | 10/2011 | Scott | G06Q 30/02 705/14.62 |
| 2011/0320960 | A1* | 12/2011 | Cai | H04L 51/02 715/752 |
| 2012/0005288 | A1* | 1/2012 | Morinaga et al. | 709/206 |
| 2012/0064924 | A1* | 3/2012 | Schapsis | H04L 51/02 455/466 |
| 2012/0096095 | A1* | 4/2012 | Bhargava | H04L 51/14 709/206 |
| 2012/0096097 | A1 | 4/2012 | Morinaga et al. | |
| 2012/0117169 | A1* | 5/2012 | Plotkin | H04L 51/36 709/206 |
| 2012/0315880 | A1* | 12/2012 | Peitrow | H04M 1/642 455/412.1 |
| 2013/0065549 | A1* | 3/2013 | Sennett | H04M 1/72538 455/404.1 |
| 2013/0303106 | A1* | 11/2013 | Martin | H04W 4/12 455/404.2 |
| 2014/0057610 | A1* | 2/2014 | Olincy | H04W 4/16 455/414.1 |
| 2015/0200906 | A1* | 7/2015 | Ganesh | H04L 51/34 709/206 |

FOREIGN PATENT DOCUMENTS

| | | |
|---|---|---|
| CN | 101640863 A | 2/2010 |
| CN | 102308291 A | 1/2012 |
| EP | 2 020 644 A1 | 2/2009 |
| EP | 2 395 434 A1 | 12/2011 |
| JP | 2004-023110 A | 1/2004 |
| JP | 2004-153436 A | 5/2004 |
| JP | 2005-234936 A | 9/2005 |
| JP | 2005-348167 A | 12/2005 |
| JP | 2008141421 A | 6/2008 |
| JP | 2009-021671 A | 1/2009 |
| JP | 2010-231351 A | 10/2010 |
| KR | 20010011055 A | 2/2001 |
| KR | 2001-0110386 A | 12/2001 |
| KR | 20020007448 A | 1/2002 |
| KR | 2003-0021034 A | 3/2003 |
| KR | 10-2004-0087660 A | 10/2004 |
| KR | 10-2006-0042812 A | 5/2006 |
| KR | 10-2006-0099783 A | 9/2006 |
| KR | 10-2008-0095133 A | 10/2008 |
| RU | 2 423 021 C2 | 6/2011 |
| RU | 119 197 U1 | 8/2012 |
| WO | 20101068878 A1 | 6/2010 |
| WO | 2010/140781 A2 | 12/2010 |

OTHER PUBLICATIONS

Korean Office Action dated Sep. 13, 2018, issued in Korean Patent Application No. 10-2012-0130234.

* cited by examiner

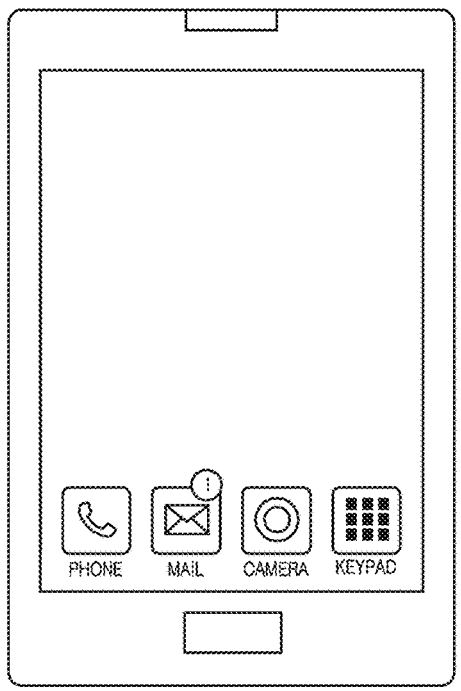
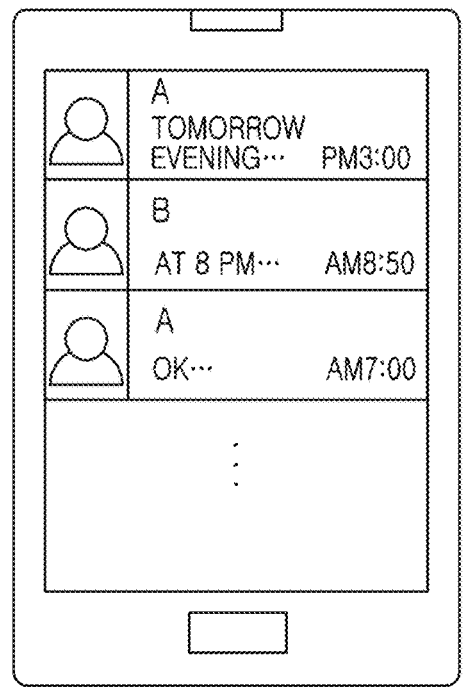
FIG.1A  FIG.1B
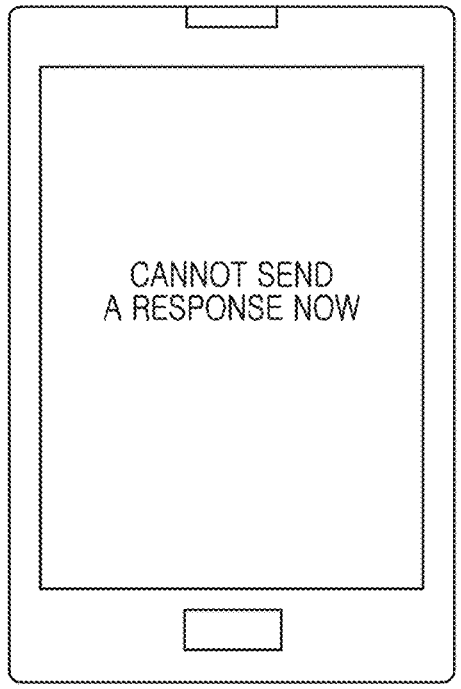
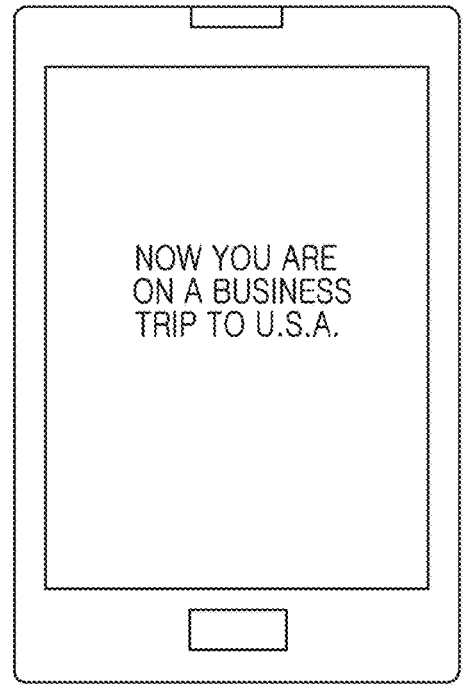
FIG.1C  FIG.1D

ELECTRONIC DEVICE AND METHOD FOR SENDING RESPONSE MESSAGE ACCORDING TO CURRENT STATUS

CROSS-REFERENCE TO RELATED APPLICATION(S)

This application claims the benefit under 35 U.S.C. § 119(a) of a Korean patent application filed on Nov. 16, 2012 in the Korean Intellectual Property Office and assigned Serial No. 10-2012-0130234, the entire disclosure of which is hereby incorporated by reference.

TECHNICAL FIELD

The present disclosure relates to an apparatus and a method for automatic response message. More particularly, the disclosure relates to an apparatus and a method for automatically sending a response message when a received message is not confirmed within a preset time or a response message of the confirmed message is not sent within a preset time.

BACKGROUND

When a caller tries to make a call to a callee, the callee can check the call when the callee's electronic device is turned on or when the electronic device is in a power-save mode.

However, after sending a message to the callee, the caller can merely confirm whether the callee receives the message but cannot obtain the status of the callee. For example, even when receipt of the message is confirmed or is not confirmed, the callee may not compose a message according to a situation or a task. In this case, the caller is unable to determine why the callee does not respond to the message, thereby raising concerns regarding trust between the caller and callee.

Thus, what is needed is a method for, when the electronic device receiving the message determines that a contact number associated with the electronic device sending the message corresponds to a preset contact number, automatically determining the user's status and automatically sending a response message to the caller electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address the above-mentioned problems and/or disadvantages and to provide at least the advantages described below. Accordingly, an aspect of the present disclosure is to provide an apparatus and a method for automatically sending a response message when a received message is not confirmed within a preset time or a response message of the confirmed message is not sent within a preset time.

Another aspect of the present disclosure is to provide an apparatus and a method for protecting user's privacy by automatically sending a response message only when a contact number of an electronic device sending a message is a preset contact number.

Yet another aspect of the present disclosure is to provide an apparatus and a method for writing and sending a message based on a user's current status by automatically detecting the current status.

According to an aspect of the present disclosure, an operating method of an electronic device is provided. The method includes determining whether a received message is confirmed within a preset time, when the received message is not confirmed within the preset time, determining whether a contact number of a sender electronic device is a preset contact number, and when the contact number of the sender electronic device is the preset contact number, sending an automatic response message to the sender electronic device corresponding to a preset automatic response message status.

In accordance with another aspect of the present disclosure, the method may further include determining whether the electronic device is turned on, and when the electronic device is turned off, receiving at least one message after the electronic device is turned on.

In accordance with another aspect of the present disclosure, the method may further include when the electronic device is turned on, determining whether a current operation mode is set to a power-save mode, and when the current operation mode is set to the power-save mode, receiving at least one message after the current operation mode is switched to a normal mode.

In accordance with another aspect of the present disclosure, the method may further include when the electronic device is turned on, determining whether a current operation mode is set to a power-save mode, and when the current operation mode is not set to the power-save mode, receiving a message.

In accordance with another aspect of the present disclosure, the method may further include when the received message is confirmed within the preset time, determining whether a response message of the received message is transmitted to the sender electronic device within a preset time, and when the received message is not confirmed within the preset time, determining that the response message of the received message is not transmitted to the sender electronic device within the preset time.

In accordance with another aspect of the present disclosure, the sending of the automatic response message to the sender electronic device corresponding to the preset automatic response message status when the contact number of the sender electronic device is the preset contact number may include determining a preset automatic response message status, when the automatic response message status is set to send a first message, determining a current status to generate the first message, generating the first message corresponding to the determined current status, and sending the generated first message to the sender electronic device.

In accordance with another aspect of the present disclosure, the determining of the current status to generate the first message may include receiving current location information from at least one of a Global Positioning System (GPS) satellite and a base station, and determining whether the electronic device is outside a preset region, based on the received current location information.

In accordance with another aspect of the present disclosure, the determining of the current status to generate the first message may include receiving current time information from at least one of a GPS satellite and a base station, and determining that the preset time is passed, based on the received current time information.

In accordance with another aspect of the present disclosure, the determining of the current status to generate the first message may include receiving current time information from at least one of a GPS satellite and a base station, and determining whether the current time is within a preset time range, based on the received current time information.

In accordance with another aspect of the present disclosure, the determining of the current status to generate the first message may include detecting a tilt change and a spatial movement using at least one sensor operatively connected to the electronic device, and determining whether the detected tilt change and spatial movement exceed a preset tilt and preset spatial coordinates.

In accordance with another aspect of the present disclosure, the generating of the first message by reflecting the determined current status may include generating the first message indicating that the electronic device is outside the preset region.

In accordance with another aspect of the present disclosure, the generating of the first message by reflecting the determined current status may include generating the first message indicating that the preset time is passed.

In accordance with another aspect of the present disclosure, the generating of the first message corresponding to the determined current status may include determining a setting based on a time range, and generating the first message corresponding to a current time range in the setting based on the time range.

In accordance with another aspect of the present disclosure, the generating of the first message by reflecting the determined current status may include generating the first message indicating an exercise.

In accordance with another aspect of the present disclosure, the sending of the automatic response message to the sender electronic device corresponding to the preset automatic response message status when the contact number of the sender electronic device is the preset contact number may include determining the preset automatic response message status, when the automatic response message status is set to send a second message, fetching the second message; and sending the fetched second message to the sender electronic device.

In accordance with another aspect of the present disclosure, an electronic device is provided. The electronic device includes a processor unit configured to determine whether a received message is confirmed within a preset time, and to determine whether a contact number of a sender electronic device is a preset contact number when the received message is not confirmed within the preset time, and a communication module configured to, when the contact number of the sender electronic device is the preset contact number, send an automatic response message to the sender electronic device corresponding to a preset automatic response message status.

In accordance with another aspect of the present disclosure, the processor unit may determine whether the electronic device is turned on, and when the electronic device is turned off, the communication module may receive at least one message after the electronic device is turned on.

In accordance with another aspect of the present disclosure, when the electronic device is turned on, the processor unit may determine whether a current operation mode is set to a power-save mode, and when the current operation mode is set to the power-save mode, the communication module may receive at least one message after the current operation mode is switched to a normal mode.

In accordance with another aspect of the present disclosure, when the electronic device is turned on, the processor unit may determine whether a current operation mode is set to a power-save mode, and when the current operation mode is not set to the power-save mode, the communication module may receive a message.

In accordance with another aspect of the present disclosure, the processor unit may, when the received message is confirmed within the preset time, determine whether a response message of the received message is transmitted to the sender electronic device within a preset time, and confirm that the response message of the received message is not transmitted to the sender electronic device within the preset time.

In accordance with another aspect of the present disclosure, the processor unit may determine the preset automatic response message status, determine a current status to generate the first message when the automatic response message status is set to send a first message, and generate the first message corresponding to the determined current status. The communication module may send the generated first message to the sender electronic device.

In accordance with another aspect of the present disclosure, the communication module may receive current location information from at least one of a GPS satellite and a base station, and the processor unit may determine whether the electronic device is outside a preset region, based on the received current location information.

In accordance with another aspect of the present disclosure, the communication module may receive current time information from at least one of a GPS satellite and a base station, and the processor unit may determine whether the preset time is passed, based on the received current time information.

In accordance with another aspect of the present disclosure, the communication module may receive current time information from at least one of a GPS satellite and a base station, and the processor unit may determine whether the current time is within a preset time range, based on the received current time information.

In accordance with another aspect of the present disclosure, the processor unit may detect a tilt change and a spatial movement using at least one sensor operatively connected to the electronic device, and determine whether the detected tilt change and spatial movement exceed a preset tilt and preset spatial coordinates.

In accordance with another aspect of the present disclosure, the processor unit may generate the first message indicating that the electronic device is outside the preset region.

In accordance with another aspect of the present disclosure, the processor unit may generate the first message indicating that the preset time is passed.

In accordance with another aspect of the present disclosure, the processor unit may determine a setting based on a time range, and generate the first message corresponding to a current time range in the setting based on the time range.

In accordance with another aspect of the present disclosure, the processor unit may generate the first message indicating an exercise.

In accordance with another aspect of the present disclosure, the processor unit may check the preset automatic response message status, and fetch the second message when the automatic response message status is set to send the second message. The communication module may send the fetched second message to the sender electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A, 1B, 1C, and 1D illustrate electronic devices for sending a response message according to a current status according to an embodiment of the present disclosure;

Throughout the drawings, like reference numerals will be understood to refer to like parts, components and structures.

DETAILED DESCRIPTION

Figure 2A:
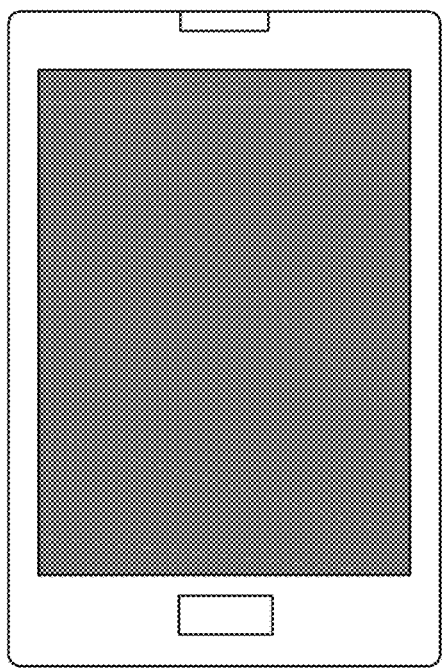
FIGS. 2A, 2B, and 2C illustrate at least one message received after a power-on when an electronic device is turned off according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

According to various embodiments of the present disclosure, as a non-exhaustive illustration only, an electronic device described herein may refer to portable devices such as a mobile phone, a Personal Digital Assistant (PDA), a mobile pad, a tablet computer, a handheld computer, a digital camera, a portable game console, an MP3 player, a Portable/Personal Multimedia Player (PMP), a handheld e-book, a portable lap-top PC, a Global Positioning System (GPS) navigation, and the like capable of wireless communication or network communication consistent with that disclosed herein.

FIGS. 1A, 1B, 1C, and 1D illustrate electronic devices for sending a response message according to a current status according to an embodiment of the present disclosure.

Referring to FIG. 1A, the electronic device, upon receiving a message from a certain electronic device, can determine whether the received message is confirmed within a preset time. More specifically, the electronic device can determine whether the message received from the certain electronic device is confirmed within the preset time. As an example, the preset time for confirming the message in the electronic device may be assumed to be 15 minutes. After receiving at least one message from the certain electronic device, the electronic device can determine whether receipt of the at least one received message is confirmed within the preset time of 15 minutes.

Referring to FIG. 1B, the electronic device can determine whether a response message is transmitted to the sender electronic device within a preset time. As an example, the preset time for confirming at least one received message in the electronic device may be assumed to be 10 minutes. In addition, the time for determining whether the response message is transmitted to the sender electronic device may be assumed to be 15 minutes. The electronic device is assumed to receive a message from the certain electronic device and then to confirm the received message within the preset 10 minutes. Next, the electronic device can determine whether a response message is transmitted to the sender electronic device within the preset 15 minutes.

When the electronic device receives the message but does not confirm the received message within the preset 10 minutes, or when the electronic device receives the message but does not send the response message within the preset 15 minutes, the electronic device can determine whether a contact number of the sender electronic device is a preset contact number. According to various embodiments of the present disclosure, the preset contact number can include at least one of one or more contact numbers stored in the electronic device, at least one input contact number among the one or more contact numbers stored in the electronic device, at least one contact number excluding a spam phone number registered in the electronic device, at least one contact number starting with a certain area code, and/or the like.

As an example, the electronic device may be assumed to store 100 contact numbers, 10 of the stored 100 contact numbers may be assumed to be registered as spam contact numbers, 15 contact numbers may be assumed to start with the area code 01, 10 contact numbers may be assumed to start with the area code 02, and 30 contact numbers may be assumed to start with the area code 03. Based on such assumptions, the electronic device can input all of the 100 stored contact numbers as the preset contact numbers, and input 90 contact numbers excluding the 10 spam contact numbers of the stored 100 contact numbers, as the preset contact numbers. Among the stored 100 contact numbers, the electronic device can input 25 contact numbers starting with the area codes 01 and 02, as the preset contact numbers, and input 35 contact numbers excluding the spam contact numbers and the contact numbers starting with the area codes 01 and 03, as the preset contact numbers. For example, the electronic device can input at least one of the stored contact numbers as the preset contact number.

Next, when determining whether the contact number of the sender electronic device corresponds to the preset contact number, the electronic device can send an automatic response message to the sender electronic device by reflecting a preset automatic response message status. Herein, the automatic response message status can be defined as any one of a status for automatically sending a first message and a status for automatically sending a second message.

Referring to FIG. 1C, the electronic device for automatically sending the second message according to the automatic response message status is described. When confirming that the contact number of the sender electronic device corresponds to the preset contact number, the electronic device can check (e.g., determine) the preset automatic response message status and then confirm that the automatic response message status is set to send the second message as shown in FIG. 1C. Next, the electronic device can fetch and send the preset second message to the sender electronic device. For example, when the preset second message is "cannot send a response now", the electronic device can fetch and automatically send the second message to the sender electronic device. For example, the second message can be defined as a normal status message not reflecting the current status of the electronic device. Accordingly, when the user does not want to automatically send the response message reflecting the user's status, the user can set the electronic device to send the second message as the automatic response message and thus send the automatic response message to the sender electronic device.

Referring to FIG. 1D, the electronic device for automatically sending the first message according to the automatic response message status is described. When receiving the message from the certain electronic device, the electronic device can determine whether the received message is confirmed within the preset time as shown in FIG. 1D. When the received message is not confirmed within the preset time or when the response message of the received message is not sent within the preset time, the electronic device can determine whether the contact number of the sender electronic device is the preset contact number. When the contact number of the sender electronic device is the preset contact number, the electronic device can determine the current status of the electronic device to write the first message based on the actual status.

Next, the electronic device can generate the first message based on the determined current status and then send the generated first message to the sender electronic device. For example, when the electronic device receives current location information from at least one of a Global Positioning System (GPS) satellite and a base station and when the electronic device is located in the United States outside a preset region, the electronic device can generate the first message "Now you are on a business trip to U.S.A." For example, the first message can be defined as a message reflecting the current status of the electronic device. Hence, when the user wants to automatically send the response message reflecting the specific status, the user can automatically generate the response message reflecting the specific status and send the message to the sender electronic device by setting the automatic response message status to the first message status.

According to the related art, when an electronic device sends a message to a certain electronic device, the sender electronic device merely determines whether the receiver electronic device confirms the received message but does not obtain the receiver's status. For example, the receiver sometimes cannot confirm the message, or cannot write a message according to the situation or the task even after confirming the message. In this case, the sender is unable to determine why the receiver cannot receive the response message, thereby raising concerns regarding trust between the sender and the receiver.

In contrast, according to various embodiments of the present disclosure, when the message is received but not confirmed within the preset time or when the message is confirmed but the response message is not transmitted within the preset time, the electronic device can automatically send the response message, to thus enhance user's convenience. More specifically, according to various embodiments of the present disclosure, the electronic device can protect the user's privacy by automatically sending the response message only when the contact number of the sender electronic device corresponds to the preset contact number. In addition, the present electronic device can automatically detect the user's current status, write the message reflecting the user's current status specifically, and automatically send the response message to the sender electronic device.

Figure 2B:
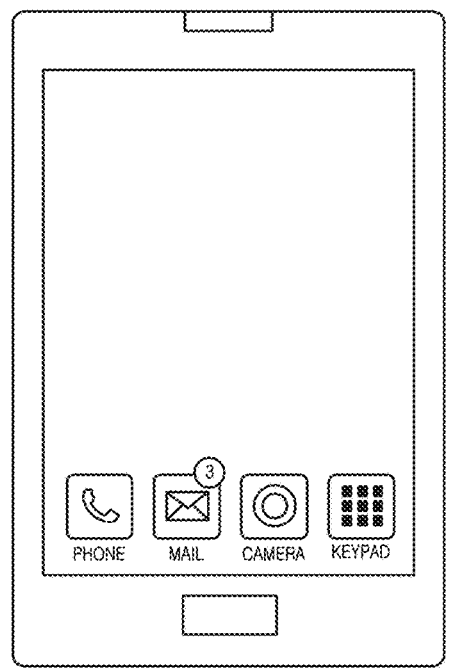
Figure 2C:
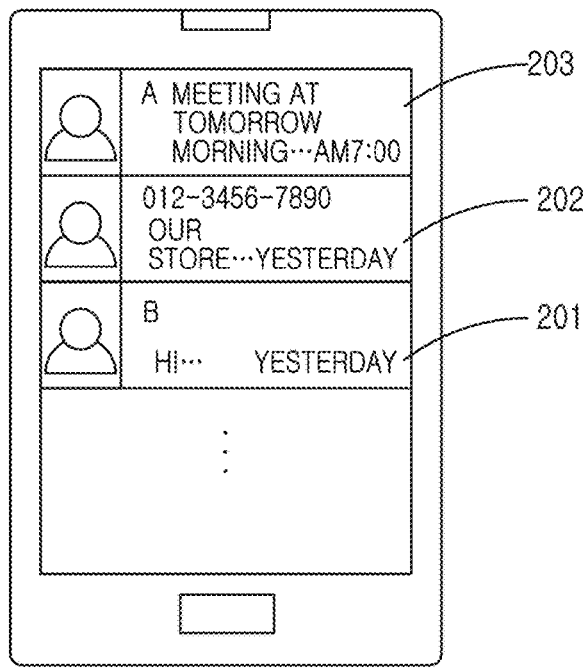

FIGS. 2A, 2B, and 2C illustrate at least one message received after a power-on when an electronic device is turned off according to an embodiment of the present disclosure.

Referring to FIGS. 2A and 2B, when the electronic device is turned off as shown in FIG. 2A, and thereafter when the electronic device is turned on as shown in FIG. 2B, the electronic device receives a message. More specifically, when the electronic device, is turned off, the electronic device is unable to receive the message. After being turned on, the electronic device can receive at least one message. For example, when an electronic device B is turned off and an electronic device A sends a message to the electronic device B, the electronic device B cannot receive the message from the electronic device A. Next, when the electronic device B is turned on, the electronic device B can receive the message from the electronic device A.

Next, the electronic device receiving the message from the certain electronic device can determine whether the received message is confirmed within the preset time. In more detail, the electronic device can determine whether at least one received message is confirmed within the preset time. For example, the preset time for determining whether the electronic device confirms the message may be assumed to be 5 minutes. The electronic device can receive at least one message from a certain electronic device, and then determine whether the at least one received message is confirmed within the preset 5 minutes. When confirming the at least one received message within the preset time as shown in FIG. 2C, the electronic device can determine whether a response message is sent to the sender electronic device within a preset time. For example, the time for confirming at least one received message in the electronic device may be assumed to be 5 minutes, and the time for determining whether the response message is transmitted to the sender electronic device after the message is confirmed may be assumed to be 10 minutes. The electronic device may be assumed to receive a message from the certain electronic device and then to confirm the received message within the preset 5 minutes. Next, the electronic device can determine whether a response message is transmitted to the sender electronic device within the preset 10 minutes.

When the electronic device receives the message but does not confirm the received message within the preset 5 minutes, or when the electronic device receives the message but does not send the response message within the preset 10 minutes, the electronic device can determine whether the contact number of the sender electronic device is the preset contact number. For example, the electronic device may be assumed to be turned on and then may be assumed to receive three messages as shown in FIG. 2C. For example, the electronic device may be assumed to confirm the three received messages and all of the contact numbers stored in the electronic device may be assumed to be input as the preset contact numbers. Because the first message 201 received at the electronic device is input as the contact number preset in the electronic device, the electronic device does not display the contact number B but displays a name of the stored B. Likewise, because the last message 203 received at the electronic device is also input as the contact number preset in the electronic device, the electronic device does not display the contact number A but displays a name of the stored A. However, because the second message 202 received at the electronic device is not input as the contact number preset in the electronic device, the electronic device can display the contact number "012-3456-7890" of the sender electronic device.

Next, when determining that the contact number of the sender electronic device is the preset contact number, the electronic device can send the automatic response message to the sender electronic device by reflecting the preset automatic response message status. Because the first message 201 and the last message 203 are input as the preset contact numbers of the electronic device, the electronic device can send the automatic response message to the electronic device A and the electronic device B by reflecting the preset automatic response message status. However, because the second message 202 is not input as the preset contact numbers of the electronic device, the electronic device may not send the automatic response message to the sender electronic device regardless of whether the electronic device confirms the received message within the preset time.

For example, when receiving the message but not confirming the message within the preset time or when receiving the message but the response message is not sent within the preset time, the electronic device can automatically send the response message, thus enhancing user's convenience.

More specifically, the electronic device can protect the user's privacy by automatically sending the response message only when the contact number of the sender electronic device is the preset contact number. In addition, because people who use the preset contact numbers input to the electronic device are closely related to the user, the electronic device can automatically send the response message even when the user cannot send the message immediately. Thus, trust between the sender and the receiver can be maintained.

Figure 3A:
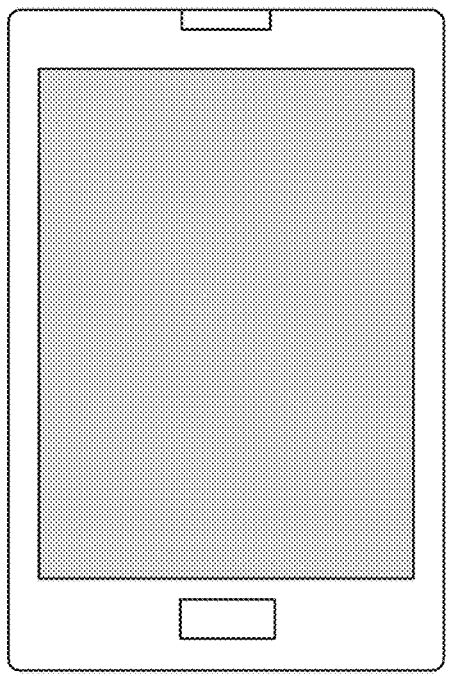
FIGS. 3A, 3B, and 3C illustrate at least one message after a mode of an electronic device is switched from a power-save mode to a normal mode according to an embodiment of the present disclosure.
Figure 3B:
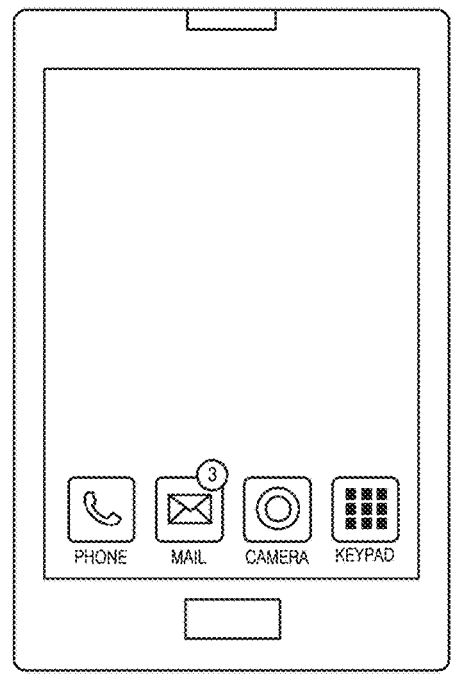
Figure 3C:
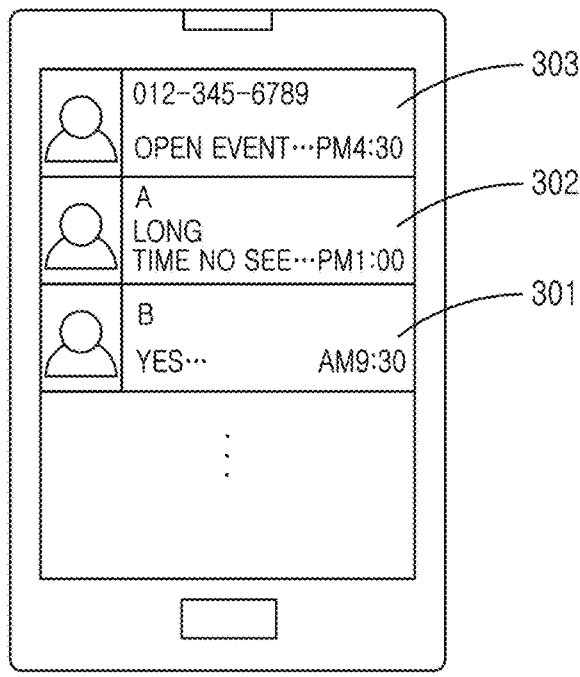

FIGS. 3A, 3B, and 3C illustrate at least one message received after a mode of an electronic device is switched from a power-save mode to a normal mode according to an embodiment of the present disclosure.

Referring to FIGS. 3A and 3B, when the electronic device is turned on, the electronic device can determine whether the current mode of the electronic device is set to the power-save mode. When the mode of the electronic device is the power-save mode, the electronic device can enter the normal mode and then receive at least one message. Herein, the power-save mode can be defined as a mode in which the electronic device is turned on but cannot currently receive the message. For example, when the mode of the electronic device is set to an airplane mode, the electronic device is turned on but cannot confirm the received message until the airplane mode is switched to the normal mode. Next, when the electronic device is switched from the power-save mode to the normal mode, the electronic device can receive at least one message which is not received in the power-save mode.

Next, the electronic device receiving the message from the certain electronic device can determine whether the received message is confirmed within the preset time. More specifically, the electronic device can determine whether the at least one message received from the certain electronic device is confirmed within the preset time. For example, the preset time for confirming the message in the electronic device may be assumed to be 15 minutes. After receiving at least one message from the certain electronic device, the electronic device can determine whether the at least one received message is confirmed within the preset 15 minutes.

Referring to FIG. 3C, when confirming the at least one received message within the preset time, the electronic device can determine whether a response message is sent to the sender electronic device within a preset time. For example, the time for confirming at least one received message in the electronic device may be assumed to be 15 minutes, and the time for, after confirming the message, determining whether the response message is transmitted to the sender electronic device is 5 minutes. The electronic device is assumed to receive the message from the certain electronic device and then to confirm the received message within the preset 15 minutes. Next, the electronic device can determine whether the response message is transmitted to the sender electronic device within the preset 5 minutes.

When the electronic device receives the message but does not confirm the received message within the preset 15 minutes or when the electronic device receives the message but does not send the response message within the preset 5 minutes, the electronic device can determine whether the contact number of the sender electronic device is the preset contact number. For example, the electronic device may be assumed to be switched from the power-save mode to the normal mode and then receives three messages as shown in FIG. 3C. The electronic device may also be assumed to confirm the three received messages and all of the contact numbers stored in the electronic device may be assumed to be input as the preset contact numbers. Because the first message 301 received at the electronic device is input as the contact number preset in the electronic device, the electronic device does not display the contact number B but displays the name of the stored B. Likewise, because the second message 302 received at the electronic device is also input as the contact number preset in the electronic device, the electronic device does not display the contact number A but displays the name of the stored A. However, because the last message 303 received at the electronic device is not input as the contact number preset in the electronic device, the electronic device can display the contact number "012-345-6789" of the sender electronic device.

Next, when determining that the contact number of the sender electronic device corresponds to the preset contact number, the electronic device can send the automatic response message to the sender electronic device by reflecting the preset automatic response message status. Because the first message 301 and the second message 302 are input as the preset contact numbers of the electronic device, the electronic device can send the automatic response message to the electronic device A and the electronic device B by reflecting the preset automatic response message status. However, because the last message 303 is not input as the preset contact numbers of the electronic device, the electronic device may not send the automatic response message to the sender electronic device regardless of whether the electronic device confirms the received message within the preset time.

For example, when receiving the message but the message is not confirmed within the preset time or when receiving the message but the response message is not sent within the preset time, the electronic device can automatically send the response message, thus enhancing user's convenience. More specifically, the electronic device can protect the user's privacy by automatically sending the response message only when the contact number of the sender electronic device is the preset contact number. In addition, because the people who use the preset contact numbers input to the electronic device are closely related to the user, the electronic device can automatically send the response message even when the user cannot immediately send the message. Thus, trust between the sender and receiver can be maintained.

FIGS. 4A, 4B, 4C, and 4D illustrate a contact number setting according to an embodiment of the present disclosure.

Referring to FIGS. 4A, 4B, 4C, and 4D, the preset contact number can include at least one of the one or more contact numbers stored in the electronic device, at least one input contact number among the one or more contact numbers stored in the electronic device, at least one contact number excluding the spam phone number registered in the electronic device, and at least one contact number starting with the certain area code. According to various embodiments of the present disclosure, the preset contact number is not limited to the above-identified examples, and can be defined variously.

Figure 4A:
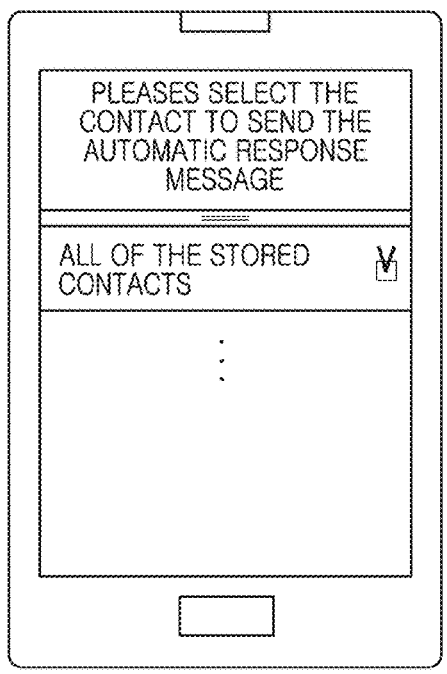
FIGS. 4A, 4B, 4C, and 4D illustrate a contact number setting according to an embodiment of the present disclosure.

As illustrated in FIG. 4A, the electronic device can select the contact number to automatically send the response message. More specifically, the electronic device can automatically select all of the stored contact numbers as the contact number to automatically send the response message. For example, the user of the electronic device may be assumed to have a job corresponds to a sales clerk who manages people of various professions, and the electronic device may be assumed to store 1,500 contact numbers. The user, who needs to immediately respond to inquiries or requirements of the people of all of the stored contact numbers, can input all of the stored contact numbers as the preset contact numbers. For example, when the electronic device inputs the all of the stored contact numbers as the preset contact numbers and then does not confirm the received message within the preset time or does not send the response message of the confirmed message within the preset time, the electronic device can send the automatic response message to the sender electronic device by reflecting the preset automatic response message status. Hence, the electronic device may not only maintain the basic trust with the people but may also immediately send the response message according to job characteristics.

Figure 4B:
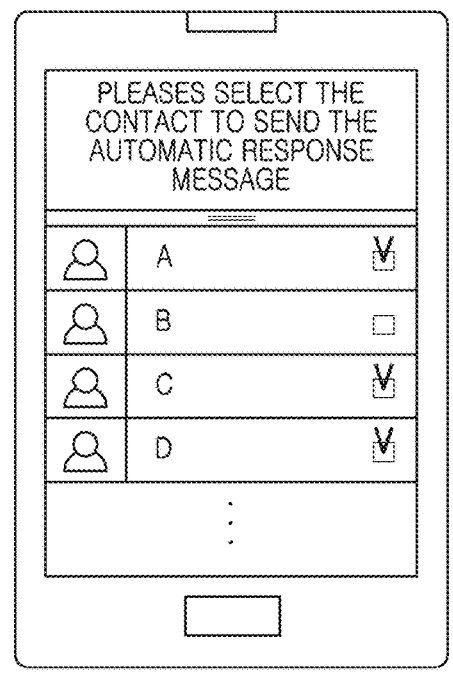

As illustrated in FIG. 4B, the electronic device can manually select the contact number or contact to whom the response message is to be automatically sent. More specifically, the electronic device can select at least one of the stored contact numbers. For example, the user of the electronic device may be assumed to be a student and the electronic device may be assumed to store 100 contact numbers. Because the user of the electronic device is the student, it is practically difficult for the user, who is attending a class or concentrating on the study, to immediately respond to every received message. In this case, the user can input the contact number of a parent or a teacher who needs to be immediately responded, as the preset contact number, and may not select the contact number of a friend or a club member who can distract the user, as the preset contact number. For example, when the electronic device selects at least one of the stored contact numbers as the preset contact number and then does not confirm the received message within the preset time or does not send the response message of the confirmed message within the preset time, the electronic device can send the automatic response message to the sender electronic device by reflecting the preset automatic response message status. Thus, the electronic device may not only maintain the basic trust with the people but may also select the preset contact number from the stored contact number when there is no need to immediately send the response message according to the job.

Figure 4C:
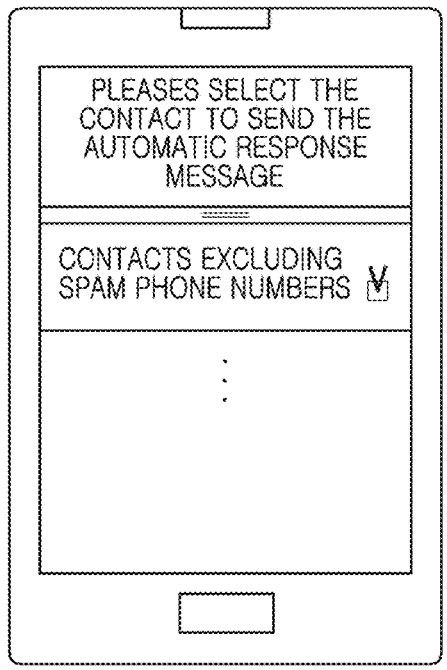

As illustrated in FIG. 4C, the electronic device can input the contact number excluding a particular phone number among the stored contact numbers, as the contact number or contact to whom the response message is to be automatically sent. More specifically, the electronic device can input the contact number excluding the spam phone number among all of the stored contact numbers, as the preset contact number. For example, the user of the electronic device may be assumed to receive many spam messages and may be assumed to register the received contact number as the spam phone number. Further, the electronic device may be assumed to store 100 contact numbers and 20 of the stored 100 contact numbers may be assumed to be registered as the spam phone numbers. The user of the electronic device can input the 80 contact numbers, excluding the 20 spam phone numbers, as the preset contact numbers. As a result, the user does not have to send the automatic response message to the 20 spam contact numbers amongst the stored 100 contact numbers of the electronic device. For example, the user may register a number as a spam phone number so that the user does not send an automatic response to a message received therefrom. When the electronic device sets the spam contact number to the preset contact number, it can increase the spam message. Hence, the electronic device cannot only maintain the basic trust with the people but also select the preset contact number among the stored contact numbers when there is no need to immediately send the response message according to the job or associated function of the user.

Figure 4D:
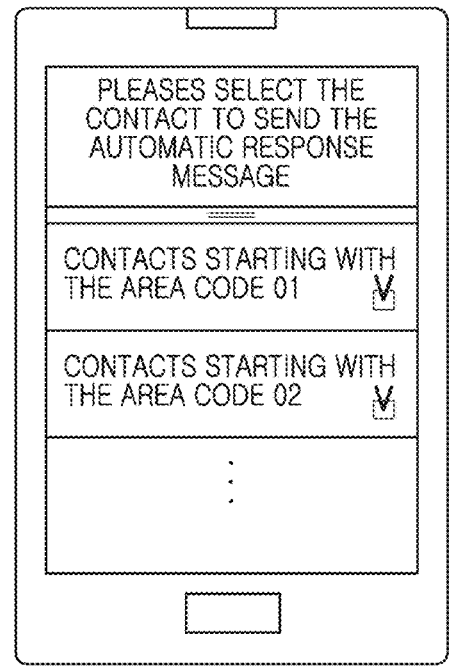

As illustrated in FIG. 4D, the electronic device can input the contact number starting with the certain area code, as the contact number or contract to whom the response message is to be automatically sent. More specifically, the electronic device can input not only the stored contact numbers but also the contact number starting with at least one area code, which is not stored in the electronic device, as the preset contact numbers. For example, the user of the electronic device may be assumed to be an employee working as a researcher. Further, the area code of a user's residence may be assumed to start with 01, and the area code of a user's company may be assumed to start with 02. The user, who does not frequently communicate with the people in other region according to his/her job and determines that most of calls incoming from other regions have the wrong number or are useless in the user's experience, can input only the area code 01 of the residence and the area code 02 of the company as the preset contact numbers. For example, the electronic device can input the contact number starting with the particular area code together with the stored contact number of other electronic device, and send the automatic response message of the message received from the contact number starting with the corresponding area code.

Figure 5A:
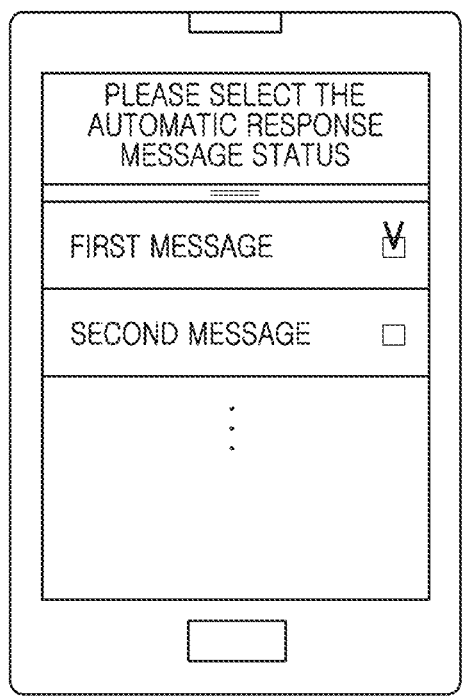
FIGS. 5A and 5B illustrate setting of an automatic response message status according to an embodiment of the present disclosure.
Figure 5B:
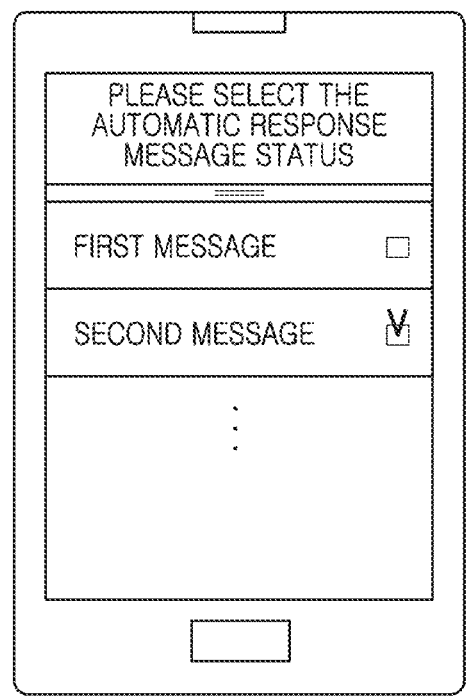

FIGS. 5A and 5B illustrate setting of an automatic response message status according to an embodiment of the present disclosure.

Referring to FIGS. 5A and 5B, the automatic response message status can be any one of the status for automatically sending the first message and the status for automatically sending the second message. More specifically, according to the preset automatic response message status, the electronic device can automatically send the response message when the electronic device receives the message but does not confirm the received message within the preset time or when the electronic device receives the message but does not send the response message within the preset time.

As illustrated in FIG. 5A, to select one of the automatic response message statuses, the electronic device can display a guide message for setting the automatic response message status on a touch screen. In more detail, the electronic device can display the guide message on a touch screen thereof in order to select one of the first message and the second message which are the automatic response message statuses. Next, when the first message is selected as the automatic response message status, the electronic device can generate the first message reflecting the actual status and send the generated first message to the sender electronic device. Herein, the automatic response message status is set to send the first message, which signifies that the electronic device generates and sends the message reflecting the actual status to the sender electronic device. More specifically, when sending the automatic response message to the sender electronic device, the electronic device generates the message reflecting the actual status, rather than generating a uniform and typical message.

As example, the electronic device A may be assumed to receive a message from the electronic device B at 2:00 AM, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to set to generate the first message. When receiving the message from the electronic device B and then the received message is not confirmed within the preset 10 minutes, the electronic device A can obtain the actual status. Next, the electronic device A can confirm the current time 2:00 AM, generate the first message "you are now sleeping", and send the automatic response message to the electronic device B.

Similarly, when the electronic device A receives the message from the electronic device B, confirms the received message within the preset 10 minutes, but does not send the response message of the received message within the preset 15 minutes, the electronic device A can obtain the actual status. Next, the electronic device A can confirm the current time 2:00 AM, generate the first message "you are now sleeping", and send the automatic response message to the electronic device B. Hence, to automatically send the response message reflecting the user's specific status, the user can select the first message as the automatic response message status, automatically generate the response message reflecting the user's specific status, and send the automatic response message to the sender electronic device.

As illustrated in FIG. 5B, to select one of the automatic response message statuses, the electronic device can display the guide message for setting the automatic response message status on the touch screen. In more detail, the electronic device can display the guide message on a touch screen thereof in order to select one of the first message and the second message of the automatic response message status. Next, when the second message is selected as the automatic response message status, the electronic device can generate and send the second message being the preset automatic response message to the sender electronic device. Herein, the automatic response message status is set to send the second message, which signifies that the electronic device fetches and sends the preset message to the sender electronic device, rather than generating the message reflecting the actual status of the electronic device. More specifically, when sending the automatic response message to the sender electronic device, the electronic device sends the uniform message not reflecting the actual status of the electronic device.

As an example, the electronic device A may be assumed to receive a message from the electronic device B, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to be set to generate the second message, and the second message may be assumed to be "cannot send a response now". When receiving the message from the electronic device B and then the received message is not confirmed within the preset 10 minutes, the electronic device A can obtain the automatic response message status. Next, because the automatic response message status of the electronic device A is set to send the second message, the electronic device A can fetch the stored second message regardless of the current status of the electronic device. The electronic device A can automatically send the fetch second message ("cannot send a response now") to the electronic device B. Similarly, when the electronic device A receives the message from the electronic device B, confirms the received message within the preset 10 minutes, but does not send the response message of the received message within the preset 15 minutes, the electronic device A can fetch the stored second message regardless of the current status of the electronic device. Next, the electronic device A can automatically send the fetch second message ("cannot send a response now") to the electronic device B. Hence, in order to not automatically send the response message reflecting the specific status, the user can store the general second message and send the automatic response message to the sender electronic device.

Figure 6:
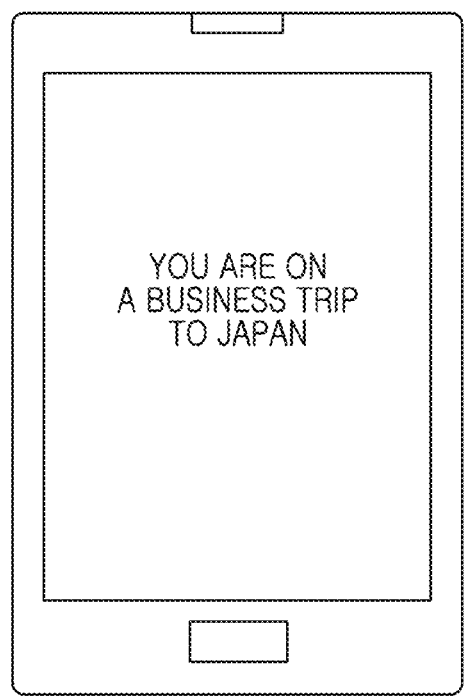
FIG. 6 illustrates an automatic response message sent by generating a first message based on an actual status of an electronic device according to an embodiment of the present disclosure.

FIG. 6 illustrates an automatic response message sent by generating a first message based on an actual status of an electronic device according to an embodiment of the present disclosure.

Referring to FIG. 6, when the automatic response message status is set to generate the first message, the electronic device can reflect the actual status of the electronic device to generate the first message. In detail, the electronic device can generate the first message reflecting the actual status of the electronic device and send the automatic response message to the sender electronic device.

As an example, the user of the electronic device A assumed to be living in South Korea goes to Osaka, Japan for a business trip and may be assumed to now be in Osaka, Japan, and the electronic device A may receive a message from the electronic device B. Further, the preset time for determining whether the electronic device A confirms the message may be assumed to be 20 minutes, the preset time for determining whether the response message of the confirmed message is transmitted may be assumed to be 30 minutes, and the automatic response message status of the electronic device A may be assumed to be set to generate the first message. In this case, when the electronic device A receives the message from the electronic device B and does not confirm the received message within the preset 20 minutes, the electronic device A can obtain the actual status. Next, the electronic device A can receive current location information from at least one of the GPS satellite and the base station and confirm the current location of the electronic device A as being in Osaka, Japan. As shown in FIG. 6, the electronic device A can generate the first message "you are on a business trip to Japan" reflecting the actual status of the electronic device A and send the automatic response message to the electronic device B.

Similarly, when the electronic device A receives the message from the electronic device B, confirms the received message within the preset 20 minutes, but does not send the response message of the received message within the preset 30 minutes, the electronic device A can obtain the actual status. Next, the electronic device A can receive the current location information from at least one of the GPS satellite and the base station and confirm the current location of the electronic device A in Osaka, Japan. As shown in FIG. 6, the electronic device A can generate the first message "you are on a business trip to Japan" reflecting the actual status of the electronic device A and send the automatic response message to the electronic device B. Thus, to automatically send the response message reflecting the specific status, the user can select the first message as the automatic response message status, automatically generate the response message reflecting the user's specific status, and send the automatic response message to the sender electronic device.

Figure 7A:
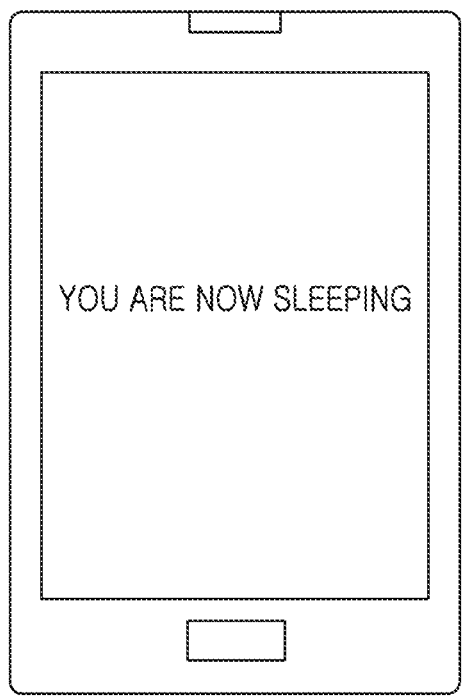
FIGS. 7A and 7B illustrate an automatic response message sent by generating a first message based on an actual status of an electronic device according to an embodiment of the present disclosure.
Figure 7B:
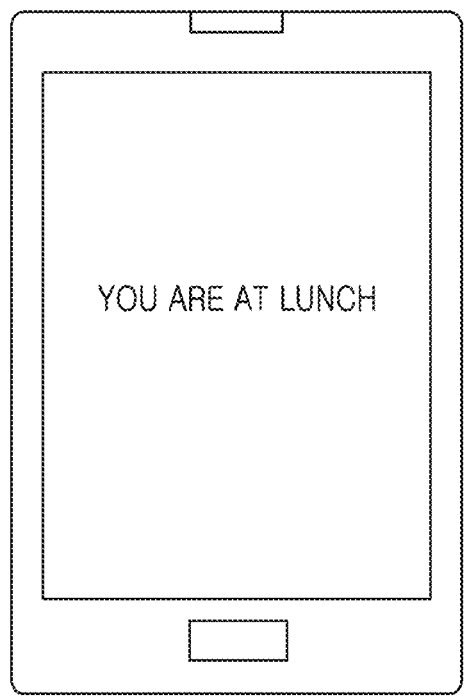

FIGS. 7A and 7B illustrate an automatic response message sent by generating a first message based on an actual status of an electronic device according to an embodiment of the present disclosure.

Referring to FIGS. 7A and 7B, the automatic response message status is set to generate the first message, the electronic device can reflect the actual status of the electronic device to generate the first message. In detail, the electronic device can generate the first message reflecting the actual status of the electronic device and send the automatic response message to the sender electronic device.

For example, the electronic device A may be assumed to receive a message from the electronic device B at 3:00 AM, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to be set to generate the first message. When receiving the message from the electronic device B and the received message is not confirmed within the preset 10 minutes, the electronic device A can obtain the actual status. Next, as illustrated in FIG. 7A, the electronic device A can confirm the current time 3:00 AM, generate the first message "you are now sleeping", and send the automatic response message to the electronic device B.

Similarly, when the electronic device A receives the message from the electronic device B, confirms the received message within the preset 10 minutes, but does not send the response message of the received message within the preset 15 minutes, the electronic device A can obtain the actual status. Next, as illustrated in FIG. 7A, the electronic device A can confirm 3:00 AM, generate the first message "you are now sleeping", and send the automatic response message to the electronic device B. Hence, to automatically send the response message reflecting the specific status, the user can select the first message as the automatic response message status, automatically generate the response message reflecting the user's specific status, and send the automatic response message to the sender electronic device.

For example, the electronic device A may be assumed to receive a message from the electronic device B at 12:30 PM, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to be set to generate the first message. When receiving the message from the electronic device B and the received message is not confirmed within the preset 10 minutes, the electronic device A can obtain the actual status. Next, as illustrated in FIG. 7B, the electronic device A can confirm the current time 12:30 PM, generate the first message "you are at lunch", and send the automatic response message to the electronic device B.

Similarly, when the electronic device A receives the message from the electronic device B, confirms the received message within the preset 10 minutes, but does not send the response message of the received message within the preset 15 minutes, the electronic device A can obtain the actual status. Next, as illustrated in FIG. 7B, the electronic device A can confirm the current time 12:30 PM, generate the first message "you are at lunch", and send the automatic response message to the electronic device B. Hence, to automatically send the response message reflecting the specific status, the user can select the first message as the automatic response message status, automatically generate the response message reflecting the user's specific status, and send the automatic response message to the sender electronic device.

Figure 8A:
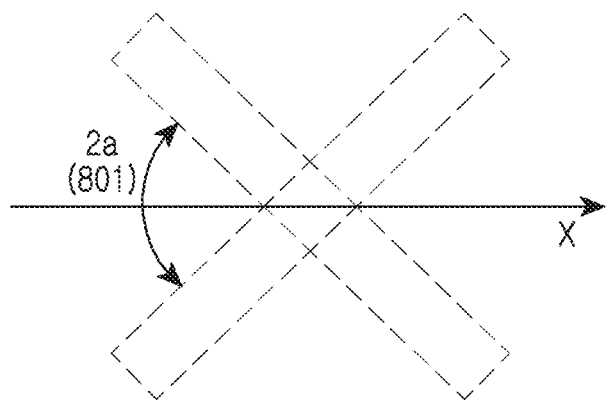
FIGS. 8A and 8B illustrate an automatic response message sent by generating a first message based on an actual status of an electronic device according to an embodiment of the present disclosure.
Figure 8B:
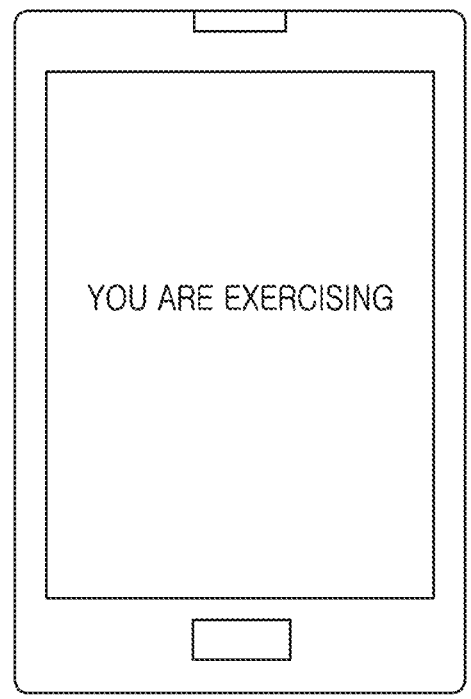

FIGS. 8A and 8B illustrate an automatic response message sent by generating a first message based on an actual status of an electronic device according to an embodiment of the present disclosure.

Referring to FIGS. 8A and 8B, when the automatic response message status is set to generate the first message, the electronic device can reflect the actual status of the electronic device to generate the first message. In detail, the electronic device can generate the first message reflecting the actual status of the electronic device and send the automatic response message to the sender electronic device.

For example, the electronic device A, when detecting a tilt change and a spatial movement and determining that the detected tilt change and spatial movement exceed a preset tilt and preset spatial coordinates, may be assumed to set to generate the first message indicating the current exercise. More specifically, as illustrated in FIG. 8A, the electronic device A may be assumed to be set to generate the first message indicating the exercise when detecting the upward or downward tilt of the electronic device A exceeding 2a degrees 801 over a preset number of times during a preset time based on a portrait mode in parallel with the horizontal plane. Further, the electronic device A may be assumed to receive a message from the electronic device B, the preset time for determining whether the electronic device A confirms the message may be assumed to be 10 minutes, and the preset time for determining whether the response message of the confirmed message is transmitted may be assumed to be 15 minutes. When receiving the message from the electronic device B and the received message is not confirmed within the preset 10 minutes, the electronic device A can obtain the actual status. Next, as illustrated in FIG. 8A, when detecting the upward or downward tilt exceeding the 2a degrees 801 over the preset number of times during the preset time based on the X axis, the electronic device A can generate the first message indicating the exercise. Next, the electronic device A can send the automatic response message "you are exercising" being the generated first message, to the electronic device B.

Likewise, when receiving the message from the electronic device B, confirming the received message within the preset 10 minutes, but the response message of the received message is not sent within the preset 15 minutes, the electronic device A can obtain the actual status. Next, as illustrated in FIG. 8A, when detecting the upward or downward tilt exceeding the 2a degrees 801 over the preset number of times during the preset time based on the X axis, the electronic device A can generate the first message indicating the exercise. Next, as illustrated in FIG. 8B, the electronic device A can send the automatic response message "you are exercising" being the generated first message, to the electronic device B. Hence, to automatically send the response message reflecting the specific status, the user can select the first message as the automatic response message status, automatically generate the response message reflecting the user's specific status, and send the automatic response message to the sender electronic device.

Figure 9A:
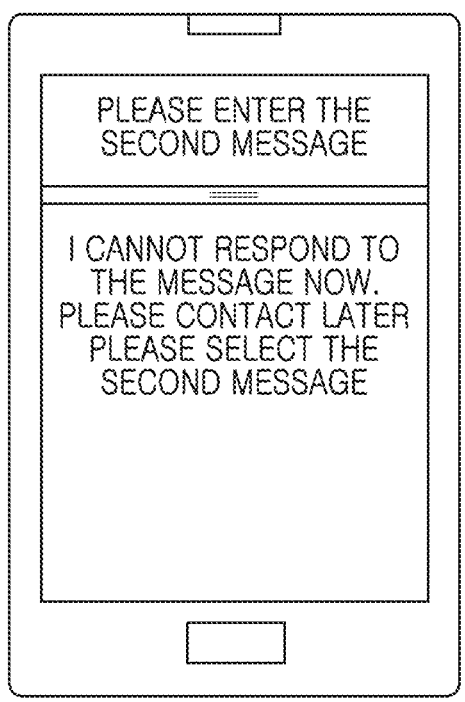
FIGS. 9A and 9B illustrate an automatic response message sent by fetching a second message stored according to an embodiment of the present disclosure.
Figure 9B:
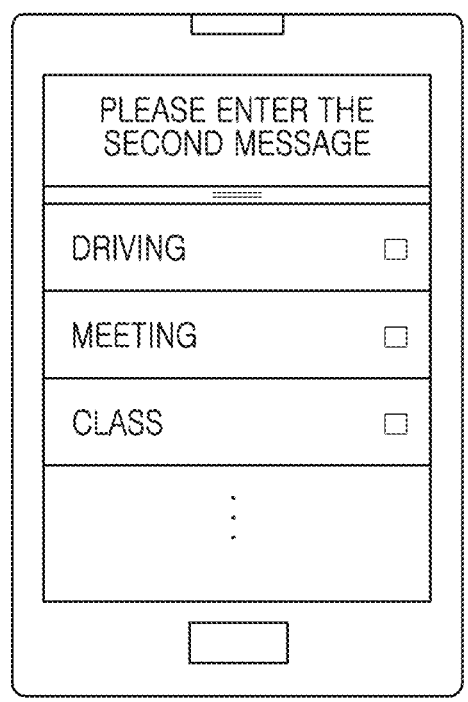

FIGS. 9A and 9B illustrate an automatic response message sent by fetching a stored second message according to an embodiment of the present disclosure.

Referring to FIGS. 9A and 9B, the automatic response message status is set to automatically send the second message, the electronic device can fetch and send the stored second message to the sender electronic device. More specifically, when the received message is not confirmed within the preset time or when receiving the message but the response message is not sent to the sender electronic device within the preset time, the electronic device can determine whether the contact of the sender electronic device is the preset contact number. Next, when the contact number of the sender electronic device is the preset contact number, the electronic device can check (e.g., determine) the automatic response message status in detail. When the automatic response message status is set to send the second message, the electronic device can fetch and send the stored second message to the sender electronic device.

For example, as illustrated in FIG. 9A, when the automatic response message status is set to send the second message, the electronic device may directly input the second message. For example, the electronic device can directly input and store the second message together with the guide message "please enter the second message" on the touch screen. According to such various embodiments of the present disclosure, the electronic device inputs the second message "I cannot respond to the message now. Please contact later". The electronic device may display one or more stored second messages on the touch screen, and the electronic device (or the user thereof) may select and store any one of the one or more stored messages. For example, as illustrated in FIG. 9B, the electronic device may display various stored second messages such as "driving now", "in meeting now", and "in class now" on the touch screen, and the electronic device may select and store any one of the various second messages. For example, the second message can be the general status message input, without reflecting the current status of the electronic device. Hence, in order to not automatically send the response message reflecting the specific status, the user can set the general second message and send the automatic response message to the sender electronic device.

Figure 10:
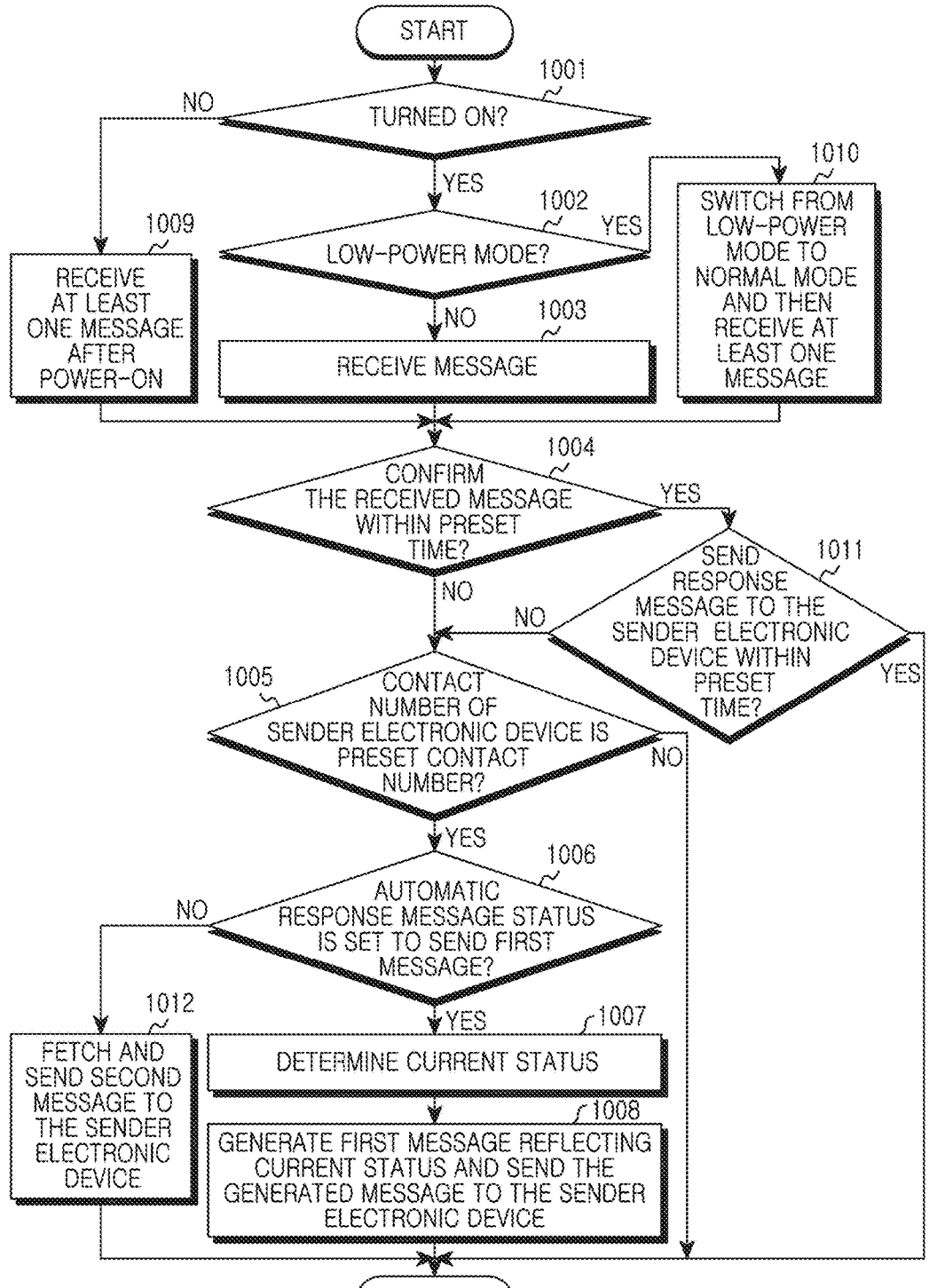
FIG. 10 illustrates operations of an electronic device according to an embodiment of the present disclosure.

FIG. 10 illustrates operations of an electronic device according to an embodiment of the present disclosure.

Referring to FIG. 10, at operation 1001, the electronic device can determine whether the electronic device is turned on. In detail, when the electronic device is turned on, the electronic device can receive the message from the certain electronic device. When the electronic device is turned off, the electronic device cannot receive the message from the certain electronic device.

When the electronic device determines that the electronic device is turned on at operation 1001, the electronic device proceeds to operation 1002 at which the electronic device can determine whether the electronic device is in the power-save mode (e.g., a low-power mode). The power-save mode can be defined as the mode in which the electronic device is turned on but cannot currently receive the message. For example, when the mode of the electronic device is set to the airplane mode, the electronic device is turned on but cannot confirm the received message until the airplane mode is switched to the normal mode.

When the electronic device determines that the electronic device is not in the power-save mode at operation 1002, the electronic device proceeds to operation 1003 at which the electronic device can receive the message. More specifically, the electronic device can receive at least one message from the certain electronic device. For example, when the electronic device A sends a message including an image to the electronic device B, the electronic device B is turned on, and the electronic device B is not in the power-save mode, the electronic device B can receive the message including the image from the electronic device A.

At operation 1004, the electronic device can determine whether the electronic device confirms the received message within the preset time. For example, the preset time for confirming the message in the electronic device may be assumed to be 5 minutes. Upon receiving at least one message from the certain electronic device, the electronic device can determine whether the electronic device confirms the at least one received message within the preset 5 minutes.

When the electronic device does not confirm the received message within the preset time at operation 1004, the electronic device proceeds to operation 1005 at which the electronic device can determine whether the contact number of the sender electronic device is the preset contact number. The preset contact number can include at least one of the one or more contact numbers stored in the electronic device, at least one input contact number among the one or more contact numbers stored in the electronic device, at least one contact number excluding the spam phone number registered in the electronic device, at least one contact number starting with a certain area code, and/or the like. For example, the electronic device may be assumed to store 100 contact numbers, 10 of the stored 100 contact numbers may be assumed to be registered as the spam contact numbers, 15 contact numbers may be assumed to start with the area code 01, 10 contact numbers may be assumed to start with the area code 02, and 30 contact numbers may be assumed to start with the area code 03. Based on such assumptions, the electronic device can input all of the 100 stored contact numbers as the preset contact numbers, and may input 90 contact numbers excluding the 10 spam contact numbers of the stored 100 contact numbers, as the preset contact numbers. Among the stored 100 contact numbers, the electronic device can input 25 contact numbers starting with the area codes 01 and 02, as the preset contact numbers, and input 35 contact numbers excluding the spam contact numbers and the contact numbers starting with the area codes 01 and 03, as the preset contact numbers. For example, the electronic device can input at least one of the stored contact numbers as the preset contact number.

When the electronic device determines that the contact number of the sender electronic device is the preset contact number at operation 1005, the electronic device proceeds to operation 1006 at which the electronic device can determine whether the automatic response message status is set to send the first message. The automatic response message status is set to send the first message, which signifies that the electronic device generates and sends the message reflecting the actual status to the sender electronic device. More specifically, to send the automatic response message to the sender electronic device, the electronic device generates the message reflecting the actual status in detail, rather than generating the uniform and typical message.

When the electronic device determines that the automatic response message status is set to send the first message at operation 1006, the electronic device proceeds to operation 1007 at which the electronic device can determine the current status of the electronic device. For example, the electronic device A may be assumed to receive a message from the electronic device B at 2:00 AM, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to be set to generate the first message. When receiving the message from the electronic device B and the received message is not confirmed within the preset 10 minutes, the electronic device A can obtain its actual status. For example, the electronic device A can confirm the current time 2:00 AM.

At operation 1008, the electronic device can generate the first message reflecting the current status and send the generated message to the sender electronic device. For example, the electronic device A may be assumed to receive a message from the electronic device B at 12:30 PM, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to be set to generate the first message. When receiving the message from the electronic device B and the received message is not confirmed within the preset 10 minutes, the electronic device A can obtain the actual status. Next, the electronic device A can confirm the current time 12:30 PM, generate the first message "you are at lunch" and send the automatic response message to the electronic device B as shown in FIG. 7B.

When the electronic device is turned off at operation 1001, the electronic device may proceed to operation 1009 at which the electronic device can be turned on and then receive at least one message. Specifically, when the electronic device is turned off, the electronic device is unable to receive a message. However, after being turned on, the electronic device can receive at least one message. For example, when the electronic device A sends a message to the electronic device B, the electronic device B, which is turned off, cannot receive the message from the electronic device A. Next, when the electronic device B is turned on, the electronic device can receive the message from the electronic device A. Next, the electronic device can determine whether the electronic device confirms the received message within the preset time, back at operation 1004.

When the electronic device determines that the electronic device is in the power-save mode (e.g., a low-power mode) at operation 1002, the electronic device proceeds to operation 1010 at which the electronic device can switch from the power-save mode to the normal mode and then receive at least one message. For example, when the mode of the electronic device is set to the airplane mode, the electronic device is turned on but cannot confirm the received message until the airplane mode is switched to the normal mode. Next, when the electronic device is switched from the power-save mode to the normal mode, the electronic device can receive at least one message which is not received in the power-save mode. Thereafter, the electronic device proceeds to operation 1004 at which the electronic device can determine whether the electronic device confirms the received message within the preset time.

When the electronic device confirms the received message within the preset time at operation 1004, the electronic device proceeds to operation 1011 at which the electronic device can determine whether the response message is transmitted to the sender electronic device within the preset time. For example, the electronic device A may be assumed to receive a message from the electronic device B. Further, the preset time for determining whether the electronic device A confirms the message may be assumed to be 20 minutes, and the preset time for determining whether the response message of the confirmed message is transmitted may be assumed to be 30 minutes. Even when receiving the message from the electronic device B and the received message is not confirmed within the preset 20 minutes, the electronic device A can determine whether the response message is transmitted within the preset 30 minutes. When sending the response message to the sender electronic device within the preset time, the electronic device finishes this process. In contrast, when the electronic device A does not send the response message to the sender electronic device within the preset time, the electronic device proceeds to operation 1005 at which the electronic device determines whether the contact number of the sender electronic device is the preset contact number back.

When the electronic device determines that the automatic response message status is not set to send the first message at operation 1006, the electronic device proceeds to operation 1012 at which the electronic device can fetch and send the second message to the sender electronic device. For example, the electronic device A may be assumed to receive a message from the electronic device B, the preset time for determining whether the electronic device A confirms the message may be assumed to be 10 minutes, and the preset time for determining whether the response message of the confirmed message is transmitted may be assumed to be 15 minutes. Further, the automatic response message status of the electronic device A may be assumed to be set to generate the second message, and the second message may be assumed to be "cannot send a response now". When receiving the message from the electronic device B and the received message is not confirmed within the preset 10 minutes, the electronic device A can obtain the preset automatic response message status. Because the automatic response message status of the electronic device A is set to send the second message, the electronic device A can fetch the stored second message regardless of the current status of the electronic device A. Next, the electronic device A can automatically send the fetch second message ("Cannot send a response now") to the electronic device B. Similarly, when the electronic device A receives the message from the electronic device B, confirms the received message within the preset 10 minutes, but does not send the response message of the received message within the preset 15 minutes, the electronic device A can fetch the stored second message regardless of its current status. Next, the electronic device A can automatically send the fetch second message ("Cannot send a response now") to the electronic device B. Hence, in order to not automatically send the response message reflecting the specific status, the user can store the general second message and send the automatic response message to the sender electronic device.

Figure 11:
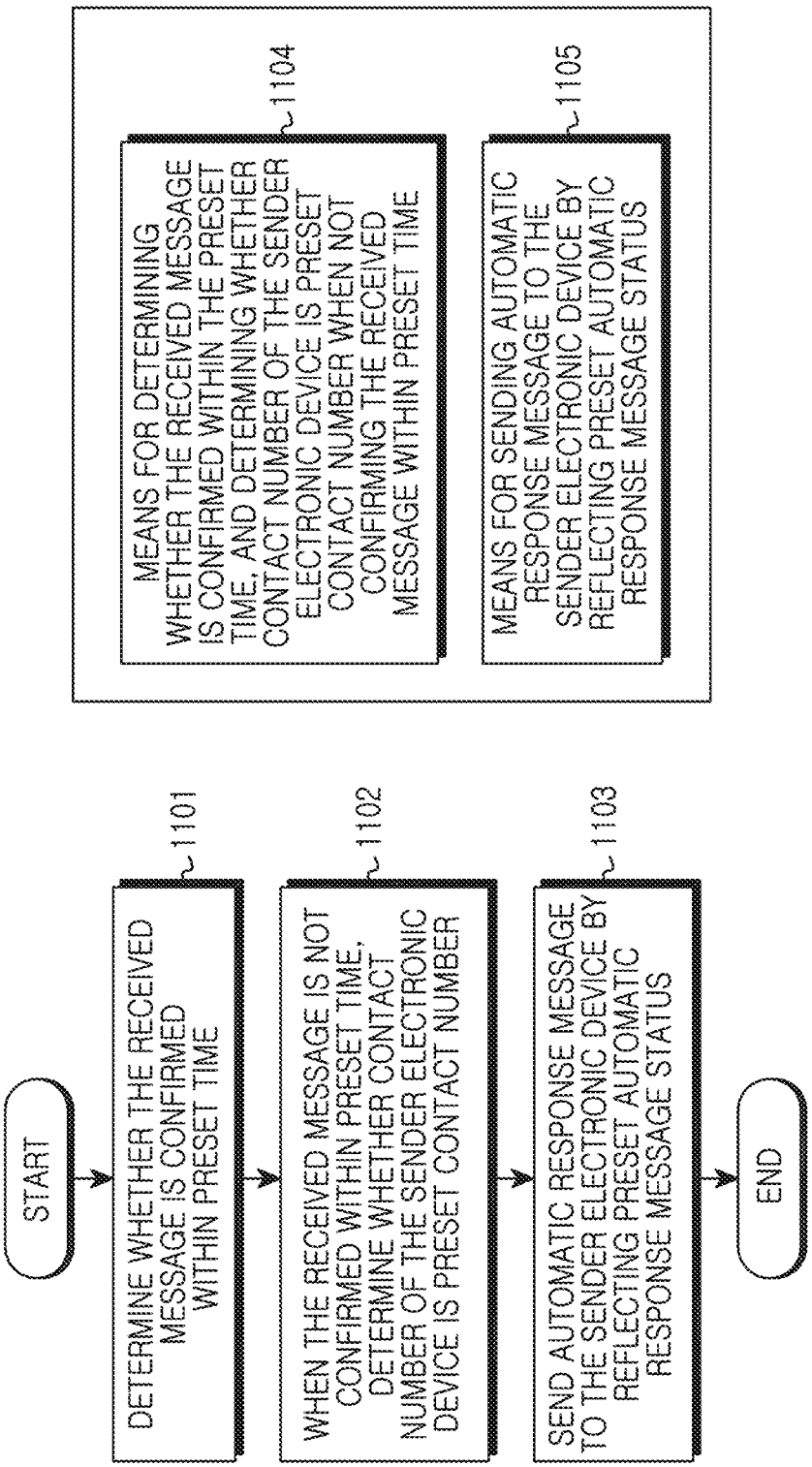
FIG. 11A illustrates a method of an electronic device for sending a response message according to a current status according to an embodiment of the present disclosure.
FIG. 11B illustrates an electronic device for sending a response message according to a current status according to an embodiment of the present disclosure.

FIG. 11A illustrates a method of an electronic device for sending a response message according to a current status according to an embodiment of the present disclosure.

Referring to FIG. 11A, at operation 1101, the electronic device can determine whether the electronic device confirms the received message within the preset time. For example, the preset time for determining whether the electronic device confirms the message may be assumed to be 5 minutes. When receiving at least one message from the certain electronic device, the electronic device can determine whether the electronic device confirms the at least one received message within 5 minutes.

At operation 1102, when the electronic device determines that the received message is not confirmed within the preset time, the electronic device can determine whether the contact number of the sender electronic device is the preset contact number at operation 1102. The preset contact number can include at least one of the one or more contact numbers stored in the electronic device, at least one input contact number among the one or more contact numbers stored in the electronic device, at least one contact number excluding the spam phone number registered in the electronic device, and at least one contact number starting with the certain area code, and/or the like.

At operation 1103, the electronic device can send the automatic response message to the sender electronic device by reflecting the preset automatic response message status. The electronic device for automatically sending the first message according to the automatic response message status is described below. When receiving the message from the certain electronic device, the electronic device can determine whether the electronic device confirms the received message within the preset time. When the received message is not confirmed within the preset time or the response message of the confirmed message is not sent within the preset time, the electronic device can determine whether the contact number of the sender electronic device is the preset contact number. When the contact number of the sender electronic device is the preset contact number, the electronic device can determine the current status of the electronic device to write the first message based on the actual status. Next, the electronic device can generate the first message based on the determined current status and then send the generated first message to the sender electronic device. For example, when the electronic device receives the current location information from at least one of the GPS satellite and the base station and is located in the United States outside a preset region, the electronic device can generate the first message "now you are on a business trip to U.S.A." Namely, the first message reflects the current status of the electronic device. Hence, when the user wants to automatically send the response message reflecting the specific status, the user can automatically generate the response message reflecting the specific status and send the message to the sender electronic device by setting the automatic response message status to the first message status.

Now, the electronic device for automatically sending the second message according to the automatic response message status is described. When confirming that the contact number of the sender electronic device is the preset contact number, the electronic device can check (e.g., determine) the preset automatic response message status and then confirm that the automatic response message status is set to send the second message. Next, the electronic device can fetch and send the preset second message to the sender electronic device. For example, when the preset second message is "Cannot send a response now", the electronic device can fetch and automatically send the second message to the sender electronic device. For example, the second message can be defined as the normal status message not reflecting the current status of the electronic device. Accordingly, when the user does not want to automatically send the response message based on the user's specific status, the user can set to send the second message as the automatic response message and send the automatic response message to the sender electronic device.

FIG. 11B illustrates an electronic device for sending a response message according to a current status according to an embodiment of the present disclosure.

Referring to FIG. 11B, the electronic device includes a processor unit 1104 and a communication module 1105.

The processor unit 1104 of the electronic device can determine whether the electronic device confirms the received message within the preset time, and determine whether the contact number of the sender electronic device is the preset contact number when the received message is not confirmed within the preset time. For example, the preset time for determining whether the processor unit confirms the message may be assumed to be 5 minutes. When receiving at least one message from the certain electronic device, the processor unit can determine whether the electronic device confirms the at least one received message within 5 minutes. Next, when the received message is not confirmed within the preset time, the processor unit can determine whether the contact number of the sender electronic device is the preset contact number. Herein, the preset contact number can include at least one of the one or more contact numbers stored in the electronic device, at least one input contact number among the one or more contact numbers stored in the electronic device, at least one contact number excluding the spam phone number registered in the electronic device, and at least one contact number starting with the certain area code.

The communication module 1105 of the electronic device can send the automatic response message to the sender electronic device by reflecting the preset automatic response message status. When the processor unit 1104 determines that the contact number of the sender electronic device is the preset contact number, the processor unit 1104 can generate the first message reflecting the current status of the electronic device and the communication module can send the generated first message to the sender electronic device. When the processor unit 1104 determines that the contact number of the sender electronic device is the preset contact number, the processor unit 1104 can check the preset automatic response message status and the communication module can fetch and send the preset second message to the sender electronic device.

Figure 12:
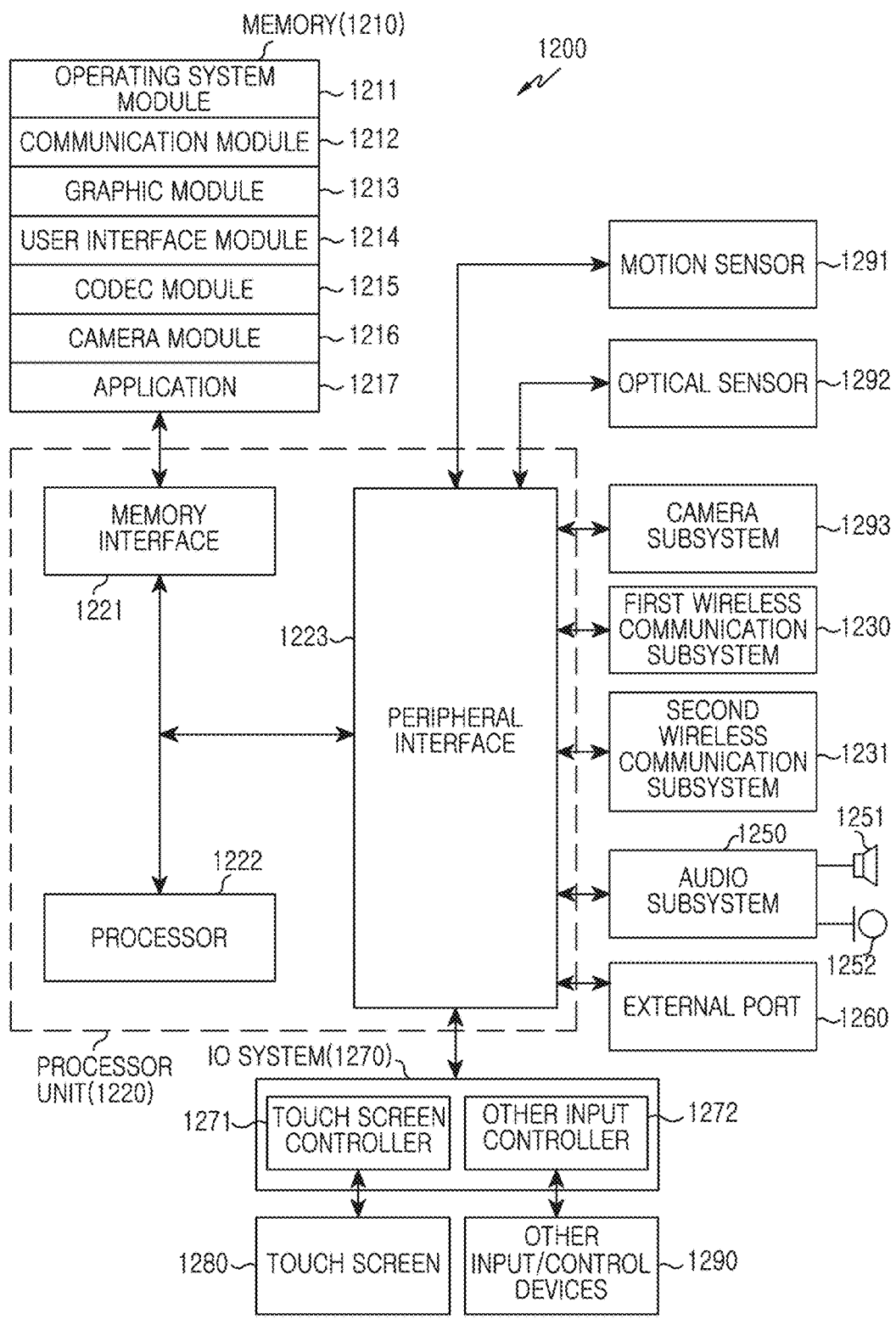
FIG. 12 illustrates an electronic device according to an embodiment of the present disclosure.

FIG. 12 illustrates an electronic device according to an embodiment of the present disclosure.

Referring to FIG. 12, the electronic device 1200 includes a memory 1210, a processor unit 1220, a first wireless communication subsystem 1230, a second wireless communication subsystem 1231, an external port 1260, an audio subsystem 1250, a speaker 1251, a microphone 1252, an Input Output (IO) system 1270, a touch screen 1280, and other input or control devices 1290. The electronic device 1200 may also include a motion sensor 1291, an optical sensor 1292, and a camera subsystem 1293. A plurality of memories 1210 and a plurality of external ports 1260 can be used.

The processor unit 1220 can include a memory interface 1221, one or more processors 1222, and a peripheral interface 1223. In some cases, the processor unit 1220 may be referred to as the processor. The processor unit 1220 determines whether the electronic device 1200 (e.g., the processor unit 1220) confirms the received message within the preset time, and determines whether the contact number of the sender electronic device is the preset contact number when the received message is not confirmed within the preset time. The processor unit 1220 determines whether the electronic device is turned on, and when the electronic device is turned on, determines whether the mode is the power-save mode. When the electronic device is turned on, the processor unit 1220 determines whether the mode is the power-save mode. When confirming the message within the preset time, the processor unit 1220 determines whether the response message of the received message is transmitted to the sender electronic device within the preset time, and confirms that the response message of the received message is not transmitted to the sender electronic device within the preset time. The processor unit 1220 checks the preset automatic response message status. When the automatic response message status is set to send the first message, the processor unit 1220 determines the current status to generate the first message and generates the first message by reflecting the determined current status. The processor unit 1220, receiving the current location information, determines the location outside the preset region, and confirms that the preset time passes according to the received current time information. The processor unit 1220 confirms that the preset time passes by receiving the current time information, detects the tilt change and the spatial movement using at least one sensor, and confirms that the detected tilt change and spatial movement exceeds the preset title and the preset spatial coordinates. The processor unit 1220 generates the first message indicating the location out of the preset region, and generates the first message indicating the elapse of the preset time. The processor unit 1220 obtains the setting based on the time range, generates the first message corresponding to the current time range of the setting based on the time range, and generates the first message indicating the exercise. The processor unit 1220 checks the preset automatic response message status. When the automatic response message status is set to send the second message, the processor unit 1220 fetches the second message. The processor unit 1220 sends the fetched second message to the sender electronic device.

The processor 1222 performs various functions for the electronic device 1200 by running various software programs, and processes and controls voice communication and data communication. In addition to such typical functions, the processor 1222 also executes particular software modules (instruction sets) stored in memory 1210 and performs various particular functions corresponding to the modules. For example, the processor 1222 carries out methods according to embodiments of the present disclosure in association with the software modules stored in the memory 1210.

The processor 1222 can include one or more data processors, an image processor, or a codec. The data processor, the image processor, or the codec may be separately provided. Alternatively, the processor 1222 may include a plurality of processors for performing different functions. The peripheral interface 1223 interconnects the IO subsystem 1270 and various peripherals of the electronic device 1200 with the processor 1222 and the memory 1210 (through the memory interface 1221).

The various components of the electronic device 1200 can be coupled using one or more communication buses or one or more stream lines.

The external port 1260 is used to connect the portable electronic device to other electronic device directly or indirectly via a network (e.g., Internet, intranet, wireless LAN, or the like). The external port 1260 can be, for example, but not limited to, a Universal Serial Bus (USB) port, a FIREWIRE port, or the like.

A motion sensor 1291 and an optical sensor 1292 are coupled to the peripheral interface 1223 to allow various functions. For example, the motion sensor 1291 and the optical sensor 1292 are coupled to the peripheral interface 1223 to detect a motion of the electronic device, amount of charge transfer, and the light from the outside. In addition, a positioning system and other sensors such as temperature sensor or bionic sensor can be coupled to the peripheral interface 1223 to perform functions thereof.

A camera subsystem 1293 can perform camera functions such as photo and video clip recording.

The optical sensor 1292 can employ a Charged Coupled Device (CCD) or a Complementary Metal-Oxide Semiconductor (CMOS) device.

The communication function is conducted through the one or more wireless communication subsystems 1230 and 1231. The wireless communication subsystems 1230 and 1231 can include radio frequency receiver and transmitter and/or optical (e.g., infrared light) receiver and transmitter. The first wireless communication subsystem 1230 and the second wireless communication subsystem 1231 can be distinguished based on a communication network of the electronic device 1200. For example, the communication network can include a communication subsystem designed to operate over, but not limited to, a Global System for Mobile communication (GSM) network, an Enhanced Data GSM Environment (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a Wireless Fidelity (Wi-Fi) network, a WiMax network, a BLUETOOTH™ network, and/or the like. The first wireless communication subsystem 1230 and the second wireless communication subsystem 1231 may be integrated into a single wireless communication subsystem.

The audio subsystem 1250 can be coupled to the speaker 1251 and the microphone 1252 to process audio stream input and output such as voice recognition, voice reproduction, digital recording, and telephone function. For example, the audio subsystem 1250 communicates with the user through the speaker 1251 and the microphone 1252. The audio subsystem 1250 receives a data signal through the peripheral interface 1223 of the processor unit 1220 and converts the received data signal to an electric signal. The converted electric signal is fed to the speaker 1251. The speaker 1251 converts the electric signal to a sound wave audible by the user and outputs the sound wave. The microphone 1252 converts the sound wave from the user or other sound sources to an electric signal. The audio subsystem 1250 receives the converted electric signal from the microphone 1252. The microphone 1252 operates when any one of two or more second sensors detects an object within a preset distance. The audio subsystem 1250 converts the received electric signal to the audio data signal and sends the converted audio data signal to the peripheral interface 1223. The audio subsystem 1250 can include an attachable and detachable ear phone, head phone, or head set.

The IO subsystem 1270 can include a touch screen controller 1271 and/or another input controller 1272. The touch screen controller 1271 can be coupled to the touch screen 1280. The touch screen 1280 and the touch screen controller 1271 can detect the contact and the motion or their abortion using, but not limited to, capacitive, resistive, infrared and surface sound wave techniques for determining one or more contact points with the touch screen 1280 and a multi-touch detection technique including various proximity sensor arrays or other elements. The other input controller 1272 can be coupled to the other input/control devices 1290. The other input/control devices 1290 can employ one or buttons, a rocker switch, a thumb wheel, a dial, a stick, a pointer such as stylus, and/or the like.

The touch screen 1280 provides an I/O interface between the electronic device 1200 and the user. For example, the touch screen 1280 forwards the user's touch input to the electronic device 1200. The touch screen 1280 also functions as a medium for displaying the output of the electronic device 1200 to the user. For example, the touch screen 1280 represents a visual output to the user. Such a visual output can be represented as text, graphic, video, and a combination of thereof.

The touch screen 1280 can employ various displays, examples of which include, but are not limited to, Liquid Crystal Display (LCD), Light Emitting Diode (LED), Light emitting Polymer Display (LPD), Organic LED (OLED), Active Matrix OLED (AMOLED), Flexible LED (FLED), and/or the like.

The memory 1210 can be coupled to the memory interface 1221. The memory 1210 can include fast Random Access Memory (RAM) such as one or more magnetic disc storage devices and/or non-volatile memory, one or more optical storage devices, and/or a flash memory (e.g., NAND and NOR).

The memory 1210 stores software. Software components include an operating system module 1211, a communication module 1212, a graphic module 1213, a user interface module 1214, a MPEG module 1215 (e.g., a codec module), a camera module 1216, and one or more application modules 1217. The modules being the software components can be represented as a set of instructions, and thus the module can be referred to as an instruction set. In addition, the module may be referred to as a program. The operating system software 1211 (the embedded operating system such as WINDOWS, LINUX, Darwin, RTXC, UNIX, OS X, or VxWorks) includes various software components for controlling general system operations. General system operations may include memory management and control, storage hardware (device) control and management, power control and management, or the like. The operating system software 1211 processes the normal communication between various hardware (devices) and software components (modules).

The communication module 1212 allows communication with other electronic device such as computer, server, and/or portable terminal, through the wireless communication subsystems 1230 and 1231 or the external port 1260. When the contact number of the sender electronic device is the preset contact number, the communication module 1212 sends the automatic response message to the sender electronic device by reflecting the preset automatic response message status. When the electronic device is turned off, the communication module 1212 receives at least one message after the power-on. When the mode is set to the power-save mode, the communication module 1212 receives at least one message after the mode is switched to the normal mode. When the mode is not set to the power-save mode, the communication module 1212 receives the message and receives the current location information from at least one of the GPS satellite and the base station. The communication module 1212 receives the current time information from at least one of the GPS satellite and the base station. The communication module 1212 sends the fetched second message to the sender electronic device.

The graphic module 1213 includes various software components for providing and displaying graphics on the touch screen 1280. The term 'graphics' encompasses text, web page, icon, digital image, video, animation, and/or the like.

The user interface module 1214 includes various software components relating to a user interface. The user interface module 1214 is involved in the status change of the user interface and the condition of the user interface status change.

The codec module 1215 can include software components relating to video file encoding and decoding. The codec module 1215 can include a video stream module such as MPEG module and/or H204 module. The codec module 1215 can include various audio file codec modules for AAA, AMR, and WMA. The codec module 1215 includes the instruction sets corresponding to the methods of the present disclosure as described herein.

The camera module 1216 includes camera related software components allowing camera related processes and functions.

The application module 1217 includes a browser, an e-mail, an instant message, a word processing, keyboard emulation, an address book, a touch list, a widget, Digital Right Management (DRM), voice recognition, voice reproduction, a position determining function, a location based service, and/or the like.

The various functions of the electronic device 1200 as stated above and to be explained, can be executed by hardware and/or software and/or a combination thereof including one or more stream processing and/or Application Specific Integrated Circuits (ASICs).

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to certain various embodiments thereof, it will be understood by those skilled in the art that various changes in form and details may be made therein without departing from the spirit and scope of the present disclosure as defined by the appended claims and their equivalents.

What is claimed is:

1. An operating method of an electronic device, the method comprising:
   receiving, from another electronic device, a message including content while the electronic device is in a normal mode;
   identifying whether a first user input for confirming the message is not detected during a first preset time duration from a time at which the message is received, or a second user input for replying to the message is not detected during a second preset time duration from the time at which the message is received, wherein the first preset time is longer than the second preset time;
   in response to the identification that one of the first user input or the second user input is not detected, identifying that a contact information of the other electronic device is included in a preset list;
   in response to the identification that the contact information of the other electronic device is included in the preset contact information, identifying an automatic response message status of the electronic device;
   in response to the identification that the automatic response message status of the electronic device is a first response message status:
      acquiring context information associated with a time, a location of the electronic device, and tilted angle of the electronic device;
      generating a response message corresponding to the received message, based on the acquired context information; and
      transmitting, to the other electronic device, the generated response message,
   wherein the generating of the response message comprises:
      identifying that the context information indicates exercise status according to the number of tilted angle of the electronic device exceeding a first preset number or the number of spatial movement of the electronic device exceeding a second preset number, wherein the tilted angle is an upward tilted angle or a downward tilted angle of the electronic device exceeding a threshold angle during a predetermined time duration, wherein the spatial movement is over a predetermined movement and is identified based on the location of the electronic device, and
      generating the response message indicating that a user of the electronic device is exercising when the context information is identified as indicating exercise status.

2. The method of claim 1, wherein the generating of the response message further comprises:
   identifying that the context information indicates business trip status when the location of the electronic device is out of a predetermined area; and
   generating the response message indicating that the user is on a business trip when the context information is identified as indicating the business trip status.

3. The method of claim 1, wherein the context information is acquired after the preset time duration ends.

4. The method of claim 1, wherein the preset list includes one of:
   contact information of users included in a contact list of the electronic device,
   contact information of users selected among users included in the contact list of the electronic device, or
   contact information of users excluding users registered as a spam user in the electronic device.

5. The method of claim 1,
   further comprising:
   in response to the identification that the automatic response message status of the electronic device is a second response message status:
      generating the response message based on a predetermined content indicating that a user of the electronic device is not capable of replying to the received message.

6. The method of claim 5, wherein the generating of the response message based on the predetermined content comprises:
   displaying a guide message for selecting a content for the response message, the guide message representing a plurality of situations the user of the electronic device may experience, receiving a touch input for selecting one situation from among the plurality of situations on a display of the electronic device, and transmitting, to the other electronic device, the response message for notifying the user of the electronic device is in the selected situation based on the received touch input.

7. An electronic device comprising:
a wireless communication unit;
a touch screen;
at least one sensor;
a memory; and
at least one processor configured to:
  receive, from another electronic device, a message including content by using the wireless communication unit, while the electronic device is in a normal mode,
  identify whether a first user input for confirming the message is not detected during a first preset time duration from a time at which the message is received, or a second user input for replying to the message is not detected during a second preset time duration from the time at which the message is received, wherein the first preset time is longer than the second preset time,
  in response to the identification that one of the first user input or the second user input is not detected, identify that a contact information of the other electronic device is included in a preset list,
  in response to the identification that the contact information of the other electronic device is included in the preset contact information, identify an automatic response message status of the electronic device,
  in response to the identification that the automatic response message status of the electronic device is a first response message status:
    acquire, by using the at least one sensor, context information associated with a time, a location of the electronic device, and tilted angle of the electronic device,
    generate a response message corresponding to the received message, based on the acquired context information, and
    transmit, to the other electronic device, the generated response message by using the wireless communication unit,
wherein the at least one processor is further configured to:
  identify that the context information indicates exercise status according to the number of a tilted angle of the electronic device exceeding a first preset number or the number of spatial movement of the electronic device exceeding a second preset number, wherein the tilted angle is an upward tilted angle or a downward tilted angle of the electronic device exceeding a threshold angle during a predetermined time duration, wherein the spatial movement is over a predetermined movement and is identified based on the location of the electronic device, and
  generate the response message indicating that a user of the electronic device is exercising when the context information is identified as indicating exercise status.

8. The electronic device of claim 7, wherein the at least one processor is further configured to:
  identify that the context information indicates business trip status when the location of the electronic device is out of a predetermined area, and
  generate the response message indicating that the user is on a business trip when the context information is identified as indicating the business trip status.

9. The electronic device of claim 7, wherein the context information is acquired after the preset time duration ends.

10. The electronic device of claim 7, wherein the preset list includes at least one of:
  contact information of users included in a contact list of the electronic device,
  contact information of users selected among users included in the contact list of the electronic device, or
  contact information of users excluding users registered as a spam user in the electronic device.

11. The electronic device of claim 7,
wherein the at least one processor is further configured to:
  in response to the identification that the automatic response message status of the electronic device is a second response message status,
    generate the response message based on a predetermined content indicating that a user of the electronic device is not capable of replying to the received message.

12. The electronic device of claim 11, wherein the at least one processor is further configured to:
  display a guide message for selecting a content for the response message, the guide message representing a plurality of situations the user of the electronic device may experience,
  receive a touch input for selecting one situation from among the plurality of situations on a display of the electronic device, and
  transmit, to the other electronic device, the response message for notifying the user of the electronic device is in the selected situation based on the received touch input.

* * * * *